(12) United States Patent
Bennett et al.

(10) Patent No.: US 8,837,892 B2
(45) Date of Patent: Sep. 16, 2014

(54) FEW MODE OPTICAL FIBERS FOR MODE DIVISION MULTIPLEXING

(75) Inventors: Kevin Wallace Bennett, Hammondsport, NY (US); Scott Robertson Bickham, Corning, NY (US); Andrey Evgenievich Korolev, St. Petersburg (RU); Dmitri Vladislavovich Kuksenkov, Big Flats, NY (US); Vladimir Nikolaevich Nazarov, St. Petersburg (RU)

(73) Assignee: Corning Incorporated, Corning, NY (US)

( * ) Notice: Subject to any disclaimer, the term of this patent is extended or adjusted under 35 U.S.C. 154(b) by 261 days.

(21) Appl. No.: 13/605,103

(22) Filed: Sep. 6, 2012

(65) Prior Publication Data
US 2013/0071115 A1    Mar. 21, 2013

Related U.S. Application Data

(60) Provisional application No. 61/535,562, filed on Sep. 16, 2011.

(51) Int. Cl.
*H04B 10/00* (2013.01)
*H04B 10/2581* (2013.01)
*G02B 6/02* (2006.01)
*G02B 6/028* (2006.01)

(52) U.S. Cl.
CPC ......... *G02B 6/02047* (2013.01); *G02M 6/0365* (2013.01); *G02B 6/02395* (2013.01); *G02B 6/0281* (2013.01); *H04B 10/2581* (2013.01)
USPC ............................ 385/128; 385/123; 385/126

(58) Field of Classification Search
USPC ............................ 398/189–201; 385/123–128
See application file for complete search history.

(56) References Cited

U.S. PATENT DOCUMENTS

| | | |
|---|---|---|
| 4,962,992 A | 10/1990 | Chapin |
| 5,104,433 A | 4/1992 | Chapin |
| 6,326,416 B1 | 12/2001 | Chien et al. |
| 6,531,522 B1 | 3/2003 | Winningham et al. |
| 6,539,152 B1 | 3/2003 | Fewkes et al. |
| 6,563,996 B1 | 5/2003 | Winningham |

(Continued)

FOREIGN PATENT DOCUMENTS

| | | |
|---|---|---|
| EP | 1338102 | 8/2003 |
| WO | WO2005/010589 | 2/2005 |

OTHER PUBLICATIONS

Single Mode Fiber Optics, Jeunhomme, pp. 39 44, Marcel Dekker, New York, 1990.
T.A. Lenahan, "Calculation of modes in an optical fiber using a finite element method and EISPACK," Bell Syst. Tech. J., vol. 62,No. 1, p. 2663, Feb. 1983.

(Continued)

*Primary Examiner* — Agustin Bello
(74) *Attorney, Agent, or Firm* — Svetlana Short

(57) ABSTRACT

An optical fiber comprising: (i) a core having a refractive index profile; (ii) an annular cladding surrounding the core; (iii) a primary coating contacting and surrounding the cladding, the primary coating having an in situ modulus of less than 0.35 MPa and an in situ glass transition temperature of less than −35° C.; and (iv) a secondary coating surrounding the primary coating, the secondary coating having an in situ modulus of greater than 1200 MPa; wherein the refractive index profile of said core is constructed to provide an LP11 theoretical cutoff wavelength greater than 2.0 μm and an effective area greater than 110 microns$^2$ at 1550 nm.

19 Claims, 6 Drawing Sheets

(56) References Cited

U.S. PATENT DOCUMENTS

| | | | |
|---|---|---|---|
| 6,689,463 B2 | 2/2004 | Chou et al. | |
| 6,724,964 B2 | 4/2004 | Lysiansky | |
| 6,775,451 B1 | 8/2004 | Botelho et al. | |
| 6,869,981 B2 | 3/2005 | Fewkes et al. | |
| 6,885,802 B2 | 4/2005 | Oliveti et al. | |
| 6,888,991 B2 | 5/2005 | White | |
| 7,010,206 B1 | 3/2006 | Baker et al. | |
| 7,221,842 B2 | 5/2007 | Baker et al. | |
| 7,272,289 B2* | 9/2007 | Bickham et al. | 385/128 |
| 7,406,237 B2 | 7/2008 | Bickham et al. | |
| 7,423,105 B2 | 9/2008 | Winningham | |
| 7,483,612 B2 | 1/2009 | DiGiovanni et al. | |
| 7,689,085 B1 | 3/2010 | Mishra | |
| 7,715,675 B2 | 5/2010 | Fabian et al. | |
| 8,093,322 B2 | 1/2012 | Hancock, Jr. et al. | |
| 8,145,027 B2* | 3/2012 | Overton et al. | 385/128 |
| 8,159,742 B2 | 4/2012 | Dong et al. | |
| 8,315,495 B2* | 11/2012 | Bickham et al. | 385/128 |
| 8,385,705 B2* | 2/2013 | Overton et al. | 385/128 |
| 2007/0077016 A1* | 4/2007 | Bickham et al. | 385/128 |
| 2008/0131062 A1* | 6/2008 | Sendai et al. | 385/100 |
| 2010/0195966 A1* | 8/2010 | Bickham et al. | 385/128 |
| 2010/0290781 A1* | 11/2010 | Overton et al. | 398/43 |
| 2011/0188822 A1* | 8/2011 | Konstadinidis et al. | 385/123 |
| 2012/0189258 A1* | 7/2012 | Overton et al. | 385/124 |
| 2012/0328255 A1 | 12/2012 | Bickham | |
| 2013/0044987 A1* | 2/2013 | Bickham et al. | 385/123 |
| 2013/0071115 A1* | 3/2013 | Bennett et al. | 398/44 |
| 2013/0182314 A1* | 7/2013 | Bennett et al. | 359/341.3 |
| 2013/0230290 A1* | 9/2013 | Evans et al. | 385/124 |
| 2014/0056596 A1* | 2/2014 | Nakanishi et al. | 398/141 |
| 2014/0086548 A1* | 3/2014 | Overton | 385/141 |

OTHER PUBLICATIONS

Siddharth Ramachandran, Jeffrey W. Nicholson, Samir Ghalmi, and Man F. Yan. "Measurement of Multipath Interference in the Coherent Crosstalk Regime". IEEE Photonics Technology Letters, vol. 15, No. 8, Aug. 2003, p. 1171.

Ming-Jun Li, Xin Chen, Paulo Dainese, Jeffrey J. Englebert, Costas Saravanos, David Z. Chen, Vijay X. Jain, Robert C. Ditmore, and George N. Bell. "Statistical Analysis of MPI in Bend-insensitive Fibers," Proceedings OFC 2009, paper OTuL1, Mar. 22, 2009.

Ring, S. et al., "Characterization of Mode Coupling in Few-Mode Fibers Using Optical Low-Coherence Reflectometry", OFC/NFOEC 2008, paper OWO5.

Kim, B.Y., "Few Mode Fiber Devices", Optical Fiber Sensors, 1988 Technical Digest Series, vol. 2 (1988).

Sillard, P. et al., "Few-Mode Fiber for Uncoupled Mode-Division Multiplexing Transmissions", ECOC Technical Digest 2011.

Kubota, H. et al., "Intermodal group velocity dispersion of few-mode fiber", IEICE Electronics Express, Oct. 25, 2010, vol. 7, No. 20, pp. 1552-1556.

Horton, A. et al., "Coupling light into few-mode optical fibres I: The diffracton limit", Optics Express, Feb. 19, 2007, vol. 15, No. 4, pp. 1443-1453.

Hussey, C.D. et al., "Approximate Analytic Forms for the Propagation Characteristics of Single-Mode Optical Fibres", Electronic Letters, Nov. 7, 1985, vol. 21, No. 23, pp. 1103-1104.

Billington, R., "Effective Area of Optical Fibres—Definition and Measurement Techniques", National Physical Laboratory, Mar. 25, 2010, pp. 1-19.

Overton, B.J., "New Optical Fiber Coating System Optimized for FTTx Applications", , Proceedings of the 56th International Wire & Cable Symposium, Nov. 11, 2007, pp. 95-98.

* cited by examiner

US 8,837,892 B2

FEW MODE OPTICAL FIBERS FOR MODE DIVISION MULTIPLEXING

CROSS-REFERENCE TO RELATED APPLICATIONS

This application claims the benefit of priority under 35 U.S.C. §119 of U.S. Provisional Application Ser. No. 61/535,562 filed on Sep. 16, 2011 the content of which is relied upon and incorporated herein by reference in its entirety.

FIELD

The present specification generally relates to optical fibers and, more specifically, to large effective area, few moded optical fibers used for mode division multiplexing.

BACKGROUND

The explosive growth in the volume and variety of multimedia telecommunication applications continues to drive speed demands for internet traffic and motivate research in backbone fiber-optic communication links. Coherent communications and electronic digital signal processing (DSP)-based receivers have been accepted in recent years as the next-generation standards for long-haul systems due to their flexibility, scalability and ability to compensate for various transmission impairments, including fiber nonlinearity.

However, the proposed DSP algorithms for nonlinearity mitigation are not anticipated to provide orders-of-magnitude performance improvements. Consequently, new transmission media and multiplexing/demultiplexing techniques may need to replace standard single-mode fibers to achieve transmission performance beyond what the DSP algorithms can provide.

Because fiber nonlinearity places a limit on achievable spectral efficiency, large effective-area (Aeff) single-mode (SM) fibers have been designed for reducing nonlinearity penalties. One proposal for further reducing the nonlinearity of the transmission fiber is to utilize fibers that guide more than one mode at the operating wavelength. In these few moded fiber (FMF) designs, the effective area of the fundamental LP01 mode is higher than in single-mode fibers, and an optical signal launched into the LP01 mode will suffer lower nonlinear impairments. However this technique will only yield good performance if the power launched in the LP01 mode remains in that mode without coupling to the LP11 mode or other higher order modes (HOMs). If this mode coupling occurs, the optical signal will be degraded by multipath interference (MPI).

However, while single mode transmission in a few moded fiber (FMF) offers an improvement over current optical transmission systems, the spectral efficiency of an optical fiber increases slowly with increasing effective area. Another solution is needed to increase system capacity. Recent experiments have demonstrated that it is possible to transmit signals in more than one spatial propagation mode of a FMF using multiple-input multiple-output (MIMO) techniques. Typical few moded fibers can introduce coupling between the modes propagating in the fiber, resulting in the optical signals that will be degraded by multipath interference (MPI).

SUMMARY

The optical fiber comprises:
(i) a core having a refractive index profile;
(ii) an annular cladding surrounding the core;
(iii) a primary coating contacting and surrounding the cladding, the primary coating having an in situ modulus of less than about 0.35 MPa and an in situ glass transition temperature of less than about −35 C;
(iv) a secondary coating surrounding the primary coating, the secondary coating having an in situ modulus of greater than about 1200 MPa; wherein
the refractive index profile of said core is constructed to provide a theoretical LP11 cutoff wavelength greater than 2.0 µm and an LP01 effective area greater than 110 µm$^2$ at 1550 nm.

According to some embodiments, the optical fiber comprises a primary coating having an in situ modulus less than about 0.3 MPa (e.g. ≤0.25 MPa, or ≤0.2 MPa).

According to some embodiments, the optical fiber comprises a primary coating having an in situ glass transition temperature less than about −40 C (e.g. ≤−45 C, or ≤−50 C).

According to some embodiments, the optical fiber comprises a secondary coating having an in situ modulus greater than about 1300 MPa (e.g. ≥1400 MPa, ≥1500 MPa, or ≥1600 MPa).

According to some embodiments the optical fiber comprises a step index refractive index profile, wherein the core is a glass core, and the cladding is a glass cladding. The core comprises: a radius $R_1$ from about 4.5 µm to about 15 µm; a maximum relative refractive index $\Delta_{1MAX}$ from about 0.2% to about 0.55% relative to the glass cladding; and an alpha value greater than 10. Preferably, the core radius $R_1$ is between about 6 and 12 µm, more preferably between about 7 and 11 µm. The core supports the propagation and transmission of the LP01 and LP11 modes at wavelengths greater than 1530 nm, and in some embodiments, a theoretical cutoff wavelength of the LP02 mode is less than about 1800 nm, which ensures that only the LP01 and LP11 modes propagate in the 1550 nm window. The LP01 effective area is greater than 110 µm$^2$ (e.g., ≥120 µm$^2$, or ≥150 µm$^2$). Preferably, the LP01 effective area is between 110 µm$^2$ and 210 µm$^2$. The glass cladding comprises a maximum relative refractive index $\Delta_{4MAX}$ such that $\Delta_{1MAX} > \Delta_{4MAX}$. In some embodiment the differential delay between the LP01 and LP11 modes is less than about 0.5 ns/km (e.g. ≤0.3 ns/km, or ≤0.1 ns/km) at a wavelength of 1550 nm.

According to some embodiments the optical fiber comprises a step index refractive index profile, wherein the core is a glass core, and the cladding is a glass cladding. The core comprises: a radius $R_1$ from about 4.5 µm to about 15 µm; a maximum relative refractive index $\Delta_{1MAX}$ from about 0.2% to about 0.55% relative to the glass cladding; and an alpha value greater than 10. Preferably, the core radius $R_1$ is between about 6 and 12 µm, more preferably between about 7 and 11 µm. The glass cladding comprises a maximum relative refractive index $\Delta_{4MAX}$ such that $\Delta_{1MAX} > \Delta_{4MAX}$. The core supports the propagation and transmission of the LP01 and LP11 modes at wavelengths greater than 1530 nm, and in some embodiments, a theoretical cutoff wavelength of the LP02 mode is less than about 1800 nm. The LP01 effective area is greater than about 110 µm$^2$. The relative delay between the LP01 and LP11 modes is less than about 0.5 ns/km (e.g. ≤0.3 ns/km, or ≤0.1 ns/km) at a wavelength of 1550 nm.

According to some embodiments the optical fiber comprises a step index refractive index profile, wherein the core is a glass core, and the cladding is a glass cladding. The core comprises: a radius $R_1$ from about 4.5 µm to about 15 µm; a maximum relative refractive index $\Delta_{1MAX}$ from about 0.2% to about 0.55% relative to the glass cladding; and an alpha value greater than 10. Preferably, the core radius $R_1$ is between about 6 and 12 µm, more preferably between about 7 and 11

μm. The glass cladding has a low-index ring surrounding the core. The low-index ring has a minimum relative refractive index $\Delta_{2MIN}<0$. The glass cladding also has an outer cladding layer surrounding the low-index ring and having a maximum relative refractive index $\Delta_{4MAX}$ such that $\Delta_{1MAX}>\Delta_{4MAX}>\Delta_{2MIN}$. The core supports the propagation and transmission of the LP01 and LP11 modes at wavelengths greater than 1530 nm and in some embodiments, a theoretical cutoff wavelength of the LP02 mode is less than about 1800 nm. The LP01 effective area is greater than about 110 μm². Preferably, the LP01 effective area is between 110 μm² and 210 μm². The relative delay between the LP01 and LP11 modes is less than about 0.5 ns/km (e.g. ≤0.3 ns/km, or ≤0.1 ns/km) at a wavelength of 1550 nm. In some embodiment the MPI is less than −30 dB at a wavelength of 1550 nm. In some embodiments the MPI is less than −35 dB at a wavelength of 1550 nm.

According to some embodiments the optical fiber comprises a graded index refractive index profile, wherein the core is a glass core, and the cladding is a glass cladding. The core comprises: a radius $R_1$ from about 4.5 μm to about 15 μm; a maximum relative refractive index $\Delta_{1MAX}$ from about 0.2% to about 0.55% relative to the glass cladding; and an alpha value less than 5. Preferably, the core radius $R_1$ is between about 7 and 13 μm, more preferably between about 8 and 12 μm. The core supports the propagation and transmission of the LP01 and LP11 modes at wavelengths greater than 1530 nm, and in some embodiments, a theoretical cutoff wavelength of the LP02 mode is less than about 1800 nm. The LP01 effective area is greater than about 150 μm². The glass cladding comprises a maximum relative refractive index $\Delta_{4MAX}$ such that $\Delta_{1MAX}>\Delta_{4MAX}$.

According to some embodiments the optical fiber comprises a graded index refractive index profile, wherein the core is a glass core, and the cladding is a glass cladding. The core comprises: a radius $R_1$ from about 4.5 μm to about 15 μm; a maximum relative refractive index $\Delta_{1MAX}$ from about 0.2% to about 0.55% relative to the glass cladding; and an alpha value less than 5. Preferably, the core radius $R_1$ is between about 7 and 13 μm, more preferably between about 8 and 12 μm. The core supports the propagation and transmission of the LP01 and LP11 modes at wavelengths greater than 1530 nm, and in some embodiments, a theoretical cutoff wavelength of the LP02 mode is less than about 1800 nm. The LP01 effective area is greater than about 110 μm². The relative delay between the LP01 and LP11 modes is less than about 0.5 ns/km (e.g. ≤0.3 ns/km, or ≤0.1 ns/km) at a wavelength of 1550 nm. The glass cladding comprises a maximum relative refractive index $\Delta_{4MAX}$ such that $\Delta_{1MAX}>\Delta_{4MAX}$.

According to some embodiments the optical fiber comprises a graded index refractive index profile, wherein the core is a glass core, and the cladding is a glass cladding. The core comprises: a radius $R_1$ from about 4.5 μm to about 15 μm; a maximum relative refractive index $\Delta_{1MAX}$ from about 0.2% to about 0.55% relative to the glass cladding; and an alpha value less than 5. Preferably, the core radius $R_1$ is between about 7 and 13 μm, more preferably between about 8 and 12 μm. The glass cladding has a low-index ring surrounding the core. The low-index ring has a minimum relative refractive index $\Delta_{2MIN}<0$. The glass cladding also has an outer cladding layer surrounding the low-index ring and having a maximum relative refractive index $\Delta_{4MAX}$ such that $\Delta_{1MAX}>\Delta_{4MAX}>\Delta_{2MIN}$. The core supports the propagation and transmission of the LP01 and LP11 modes at wavelengths greater than 1530 nm, and in some embodiments, a theoretical cutoff wavelength of the LP02 mode is less than about 1800 nm. The LP01 effective area is greater than about 110 μm² (for example, between 110 μm² and 210 μm²). The relative delay between the LP01 and LP11 modes is less than about 0.5 ns/km (e.g. ≤0.3 ns/km, or ≤0.1 ns/km) at a wavelength of 1550 nm.

According to some embodiments, the fiber comprises a graded index core with an alpha value greater than 1.8 and less than about 2.7 at a wavelength of 1550 nm. According to other embodiments, the fiber comprises a graded index core with an alpha value greater than 2.3 and less than about 2.7 at a wavelength of 1550 nm.

According to some embodiments, the relative delay between the LP01 and LP11 modes is less than about 0.3 ns/km at a wavelength of 1550 nm. According to other embodiments, the relative delay between the LP01 and LP11 modes is less than about 0.1 ns/km at a wavelength of 1550 nm.

According to some embodiments, the relative delay between the LP01 and LP11 modes is less than about 0.3 ns/km at all wavelengths between 1530 and 1570 nm. According to other embodiments, the relative delay between the LP01 and LP11 modes is less than about 0.1 ns/km at all wavelengths between 1530 and 1570 nm.

According to some embodiments, the Aeff of the LP01 mode is greater than 110 μm² at a wavelength of 1550 nm. According to other embodiments, the Aeff of the LP01 mode is greater than 110 μm² at a wavelength of 1550 nm. According to other embodiments, the Aeff of the LP01 mode is greater than 120 μm² at a wavelength of 1550 nm. According to other embodiments, the Aeff of the LP01 mode is greater than 140 μm² at a wavelength of 1550 nm. According to other embodiments, the Aeff of the LP01 mode is greater than 150 μm² at a wavelength of 1550 nm. According to other embodiments, the Aeff of the LP01 mode is greater than 160 μm² at a wavelength of 1550 nm.

Fibers made according to the examplary embodiments of the invention provide low attenuation for the LP01 and LP11 modes. According to some embodiments, the LP01 attenuation is less than 0.22 dB/km at a wavelength of 1550 nm. According to other embodiments, the LP01 attenuation is less than 0.21 dB/km at a wavelength of 1550 nm. According to other embodiments, the LP01 attenuation is less than 0.20 dB/km at a wavelength of 1550 nm. According to some embodiments, the LP11 attenuation is less than 0.25 dB/km at a wavelength of 1550 nm. According to other embodiments, the LP01 attenuation is less than 0.24 dB/km at a wavelength of 1550 nm. According to other embodiments, the LP01 attenuation is less than 0.23 dB/km at a wavelength of 1550 nm.

Fibers made according to the exemplary embodiments of the invention provide low MPI. According to some embodiments, the MPI is less than −20 dB at a wavelength of 1550 nm; according to other embodiments, the MPI is less than −25 dB at a wavelength of 1550 nm; according to other embodiments, the MPI is less than −30 dB at a wavelength of 1550 nm; and according to other embodiments, the MPI is less than −35 dB at a wavelength of 1550 nm.

Fibers made according to the exemplary embodiments of the invention provide low MPI and high LP11 cutoff wavelengths. According to some embodiments, the MPI is less than −20 dB at a wavelength of 1550 nm and a theoretical cutoff of the LP11 mode is greater than 2.4 μm. According to other embodiments, the MPI is less than −25 dB at a wavelength of 1550 nm and a theoretical cutoff of the LP11 mode is greater than 2.25 μm. According to other embodiments, the MPI is less than −30 dB at a wavelength of 1550 nm and a theoretical cutoff of the LP11 mode is greater than 2.15 μm. According to other embodiments, the MPI is less than −35 dB at a wavelength of 1550 nm and a theoretical cutoff of the LP11 mode is greater than 2.0 µm.

Accordingly, few-moded optical fibers of the embodiments described herein provide the following advantages: large effective area, low loss, small differential group delays (DGD), and/or MPI.

In the embodiments described herein, the few moded optical fibers with an optical coating that includes a primary coating that has a low in situ modulus and a secondary coating that has a high in situ modulus have substantially less coupling between the LP01 and LP11 modes. Utilizing this coating system with a fiber design that yields low delay differences between the LP01 and higher order modes is particularly advantageous for MDM systems.

Additional features and advantages of the disclosure will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
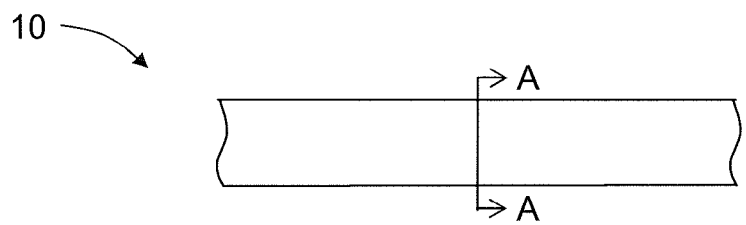
FIG. 1 schematically depicts a cross section of an optical fiber according embodiments described herein.

Reference will now be made in detail to embodiments of optical fibers for use as long haul transmission fibers, examples of which are illustrated in the accompanying drawings. Whenever possible, the same reference numerals are used throughout the drawings to refer to the same or like parts.

Terminology

The following terminology will be used herein to describe the optical fibers, with some of the parameters being introduced and defined below in connection with the various example embodiments:

The term "refractive index profile," as used herein, is the relationship between the refractive index or the relative refractive index and the radius of the fiber.

The term "relative refractive index," as used herein, is defined as:

$$\Delta(r)=[n(r)^2-n_{REF}^2)]/2n(r)^2,$$

where n(r) is the refractive index at radius r, unless otherwise specified. The relative refractive index is defined at 1550 nm unless otherwise specified. In one aspect, the reference index $n_{REF}$ is silica glass. In another aspect, $n_{REF}$ is the maximum refractive index of the cladding. As used herein, the relative refractive index is represented by Δ and its values are given in units of "%", unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

The term "updopant," as used herein, refers to a dopant which raises the refractive index of glass relative to pure, undoped $SiO_2$. The term "downdopant," as used herein, is a dopant which has a propensity to lower the refractive index of glass relative to pure, undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

As used herein, the "effective area" $A_{eff}$ of an optical fiber is the area of the optical fiber in which light is propagated and is defined as:

$$A_{eff} = 2\pi \frac{\left(\int_0^\infty E^2 r\,dr\right)^2}{\int_0^\infty E^4 r\,dr},$$

where E is the electric field associated with light propagated in the fiber and r is the radius of the fiber. The effective area is determined at a wavelength of 1550 nm, unless otherwise specified.

Mode field diameter (MFD) is a measure of the spot size or beam width of light propagating in a single mode fiber. Mode-field diameter is a function of the source wavelength, fiber core radius and fiber refractive index profile. MFD is determined using the Peterman II method where MFD=2w, and $$w^2 = 2 \frac{\int_0^\infty E^2 r dr}{\int_0^\infty (dE/dr)^2} rdr$$

where E is the electric field distribution in the fiber and r is the radius of the fiber.

The normalized wave number, or V-number of a fiber is defined as V=k*$R_1$*NA, where k is the free space wave number, $2\pi/\lambda$, $\lambda$ is the wavelength, $R_1$ is the radius of the core, and NA is the numerical aperture of the fiber. The NA is given by $(n_{core}^2-n_{clad}^2)^{1/2}=n_{core}[2\Delta_{1MAX}/(1-2\Delta_{1MAX})]^{1/2}$, where $n_{core}$ is the maximum refractive indices of the core, $n_{clad}$ is the refractive index of the cladding and $\Delta_{1MAX}$ is the maximum relative refractive index of the core with respect to the cladding.

Chromatic dispersion or dispersion of a fiber is the sum of the material dispersion, the waveguide dispersion, and the inter-modal dispersion.

The cutoff wavelength of a mode is the minimum wavelength beyond which a mode ceases to propagate in the optical fiber. The cutoff wavelength of a single mode fiber is the minimum wavelength at which an optical fiber will support only one propagating mode. The cutoff wavelength of a single mode fiber corresponds to the highest cutoff wavelength among the higher order modes. Typically the highest cutoff wavelength of a single mode fiber corresponds to the cutoff wavelength of the LP11 mode. In a few mode fiber that guides more than one mode at the operating wavelength, the LP11 cutoff wavelength is greater than the operating wavelength. A mathematical definition of a theoretical cutoff wavelength is given in Single Mode Fiber Optics, Jeunhomme, pp. 39 44, Marcel Dekker, New York, 1990, wherein the theoretical fiber cutoff is described as the wavelength at which the mode propagation constant becomes equal to the plane wave propagation constant in the outer cladding.

The cabled cutoff wavelength, or "cabled cutoff" can be approximated by the 22 m cabled cutoff test described in EIA-455-170 Cable Cutoff Wavelength of Single-mode Fiber by Transmitted Power, or "FOTP-170". Cable cutoff, as used herein, means the value obtained using the approximated test. The cabled cutoff wavelength of an optical fiber is typically 100-300 nm lower than a theoretical cutoff wavelength.

As used herein, the term "few moded fiber" refers to a fiber supporting the propagation of more modes than a single mode fiber but fewer modes than a normal multimode fiber (i.e., fewer than 10 LP modes). The number of propagating modes and their characteristics in a cylindrically symmetric optical fiber with an arbitrary refractive index profile is obtained by solving the scalar wave equation (see for example T. A. Lenahan, "Calculation of modes in an optical fiber using a finite element method and EISPACK," Bell Syst. Tech. J., vol. 62, no. 1, p. 2663, February 1983).

Light traveling in an optical fiber or other dielectric waveguide forms hybrid-type modes, which are usually referred to as LP (linear polarization) modes. The LP0p modes have two polarization degrees of freedom and are two-fold degenerate, the LP1p modes are four-fold degenerate with two spatial and two polarization degrees of freedom, and the LPmp modes with m>1 are also four-fold degenerate. We do not count these degeneracies when we designate the number of LP modes propagating in the fiber. For example, an optical fiber in which only the LP01 mode propagates is a single-mode fiber, even though the LP01 mode has two possible polarizations. A few-moded optical fiber in which the L01 and LP11 modes propagate supports three spatial modes since the LP11 mode is two-fold degenerate, and each mode also has two possible polarizations, giving a total of 6 modes. Thus, when a fiber is said to have two LP modes, it is meant that the fiber supports the propagation of all of the LP01 modes and LP11 modes.

The bend resistance or bend performance of an optical fiber may be measured by the induced attenuation of light propagating through the fiber under prescribed test conditions. The bend performance of the optical fibers described herein is determined using the pin array bend test to compare the relative resistance of the optical fibers to bending. To perform this test, attenuation is measured for an optical fiber with essentially no induced bending loss. The optical fiber is then woven about the pin array and the attenuation is once again measured. The loss induced by bending, typically expressed in units of dB, is the difference between the two attenuation measurements. The pin array is a set of ten cylindrical pins arranged in a single row and held in a fixed vertical position on a flat surface. The pin spacing is 5 mm, center to center. The pin diameter is 0.67 mm. The optical fiber is caused to pass on opposite sides of adjacent pins. During testing, the optical fiber is placed under a tension sufficient to make the optical fiber conform to the portion of the periphery of the pins contacted by the fiber. The test pertains to macro-bend resistance of the optical fiber.

The term "α-profile" or "alpha profile," as used herein, refers to a relative refractive index profile, expressed in terms of Δ which is in units of "%", where r is the radius and which follows the equation, $$\Delta = \Delta_0\left[1 - \left(\frac{r}{R_1}\right)^\alpha\right],$$

where $\Delta_0$ is the maximum relative refractive index, $R_1$ is the radius of the core, r is in the range $r_i \leq r \leq r_f$, Δ is as defined above, $r_i$ is the initial point of the α-profile, $r_f$ is the final point of the α-profile, and α is a real number exponent. For a step index profile, the alpha value is greater than or equal to 10. For a graded index profile, the alpha value is less than 10. The term "parabolic," as used herein, includes substantially parabolically shaped refractive index profiles with α=2±0.1 as well as profiles in which the curvature of the core is characterized by α=2±0.1 over the radius range from 0.1*$R_1$ to 0.95*$R_1$.

Unless otherwise specified herein, the above-referenced properties of the optical fiber disclosed herein and discussed below are measured or modeled at 1550 nm.

Method of MPI Measurement.

Figure 5:
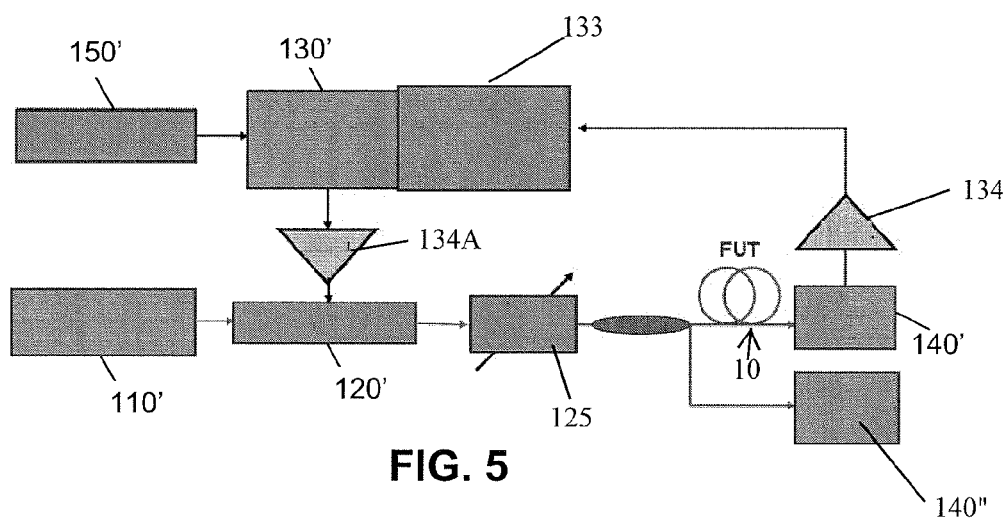
FIG. 5 is a schematic illustration of one exemplary MPI measurement system.

FIG. 5 illustrates an exemplary MPI measurement system 100' comprising a source 110', a span of the optical fiber 10 being tested (FUT), a photo detector 140' and a power meter 140". Preferably, an attenuator 125 is situated between the modulator 120' and the power meter 140". In the exemplary system of FIG. 5 an error detector 133 and an amplifier 134 are situated between the pattern generator 130' and a photodetector 140'. The MPI measurement system 100' also includes a first 2 m piece of standard single mode fiber 120" spliced to the input end of optical fiber 10 and a second 2 m piece of standard single mode fiber 130" spliced to the output end of optical fiber 10. The MPI measurement technique is described in (Siddharth Ramachandran, Jeffrey W. Nicholson, Samir Ghalmi, and Man F. Yan. "Measurement of Multipath Interference in the Coherent Crosstalk Regime". IEEE Photonics Technology Letters, Vol. 15, No. 8, August 2003, p. 1171). A stabilized continuous wave (cw) 1550 nm single frequency external cavity diode laser is launched through a 2 m piece of standard single mode fiber, which is spliced to the input end of the Fiber Under Test (FUT). To eliminate possible mode coupling at the input splice, the FUT is wound five turns around a 5 mm diameter rod to strip out any higher order modes. A second 2 m piece of standard single mode fiber is spliced to the output end of the FUT to filter out any high order modes excited by mode coupling in the FMF. The output power in the fundamental mode is detected with use of photodetector (e.g. a LabMaster Ultima power meter with a LM-2IR detector head). The specified laser linewidth is $\Delta\gamma < 100$ kHz, and the maximum intermodal delay for the FUT was $\Delta\tau < 25$ ns. The MPI is then calculated from the measured power fluctuations according to (Ming-Jun Li, Xin Chen, Paulo Dainese, Jeffrey J. Englebert, Costas Saravanos, David Z. Chen, Vijay X. Jain, Robert C. Ditmore, and George N. Bell. "Statistical Analysis of MPI in Bend-insensitive Fibers," Proceedings OFC 2009, paper OTuL1, Mar. 22, 2009):

$$MPI = 20\log\left(\left(\frac{1}{2}\right)\frac{10^{ptp,dB/10} - 1}{10^{ptp,dB/10} + 1}\right)$$

where ptp is the logarithm (in dB) of the ratio of the maximum and minimum output powers:

$$ptp(dB) = 10\log\left(\frac{Pout_{max}}{Pout_{min}}\right)$$

Method of In Situ Modulus and Tg Measurement

As used herein, the primary in situ modulus is measured as follows: A six inch sample of fiber to be measured is obtained. A one inch section from the center of the six inch sample is window-stripped with an appropriate tool and wiped with isopropyl alcohol. The sample is mounted on a sample holder/alignment stage equipped with 10×5 mm aluminum tabs to which the sample is glued. Two tabs are set so that the 10 mm length is laid horizontally and there is a 5 mm gap is between two tabs. The fiber is laid horizontally on the sample holder across the tabs so that the coated end of fiber is on one tab extending halfway into the 5 mm space between the tabs, and the stripped glass is over the other half of the 5 mm gap and the other tab. A small dot of strong adhesive (e.g. Krazy™ Glue) is then applied to the half of each tab closest to the 5 mm gap, and the fiber is then brought back over the tabs and centered over the dots of adhesive. The alignment stage is then raised until the adhesive just touches the fiber. The coated end of the fiber is then pulled through the adhesive such that at least 50% of the sample in the 5 mm gap between the tabs comprises stripped fiber. The very tip of the coated fiber is left extended beyond the adhesive on the tab so the region which will be measured is left exposed. The sample is then undisturbed for a sufficient length of time for the adhesive to cure (dry). The length of fiber fixed to the tabs is trimmed to 5 mm, and the coated length embedded in glue, the non embedded length (between the tabs), and the primary diameter are measured.

Measurements are performed on a Rheometrics DMTA IV apparatus at a constant strain of $9e^{-6}$ (1/s) for a time of forty-five minutes at room temperature (21 C). The gauge length is 15 mm Force and delta length are recorded and used for the calculation of primary modulus. Samples are prepared by removing any adhesive from the tabs that would interfere with the 15 mm clamping length to insure there is no contact with the fiber and that the sample is able to be secured squarely by the clamps. Before the measurement, the instrument force is zeroed out to establish the reference. The non-coated end is then mounted to the lower clamp (measurement probe) followed by the tab containing the coated end of the fiber being mounted to the upper (fixed) clamp. The test is then executed, and the sample is removed after the data is collected and the analysis is completed.

As used herein, the secondary in situ modulus is measured on the composite coating tube sample (stripped from the fiber) on a Rheometrics DMTA IV apparatus in tension at a frequency of 1 rad/sec, with a dynamic strain of 0.15% at room temperature (approximately 23° C.). Before the measurement, the instrument force is zeroed out to establish the reference. The sample is clamped with a gauge length of 11 mm and the program is run for two minutes. The average of the last 5 data points is the secondary in-situ modulus for that specimen. Three specimens of each sample are measured and the average of the three specimens is reported as the secondary in situ modulus. Only the cross-sectional area of the secondary coating is used in the calculation of the in situ modulus. Although the measurement is performed on a composite tube comprised of primary and secondary coating, the in-situ modulus of the primary coating is negligible when compared to the secondary coating and is thus ignored.

The in situ glass transition temperature of the composite coating tube (stripped from the fiber) is determined by determining the peak of the tan $\delta$ curves measured on a Rheometrics DMTA IV apparatus in tension at a frequency of 1 Hz. The glass transition temperature (Tg) refers to the temperature below which a coating material is brittle and above which it is flexible. An alternative (and more accurate) definition is based on the observation that the coefficient of thermal expansion changes sharply at the glass transition temperature. The glass transition temperature can be a single degree or a short range of degrees. The glass transition temperature (Tg) of polymeric materials may be measured by a variety of techniques such as differential scanning calorimetry (DSC) or dynamic mechanical analysis (DMA). The coatings properties disclosed herein were determined using DMA. The samples were characterized using a DMA instrument in tension mode at a frequency of 1 Hz. The samples were evaluated over the temperature range of −80 C to 150 C at 2 C/min at 0.3% strain and with a sample gage length of 11 mm. In the DMA analysis, the value for the Tg is frequently defined as the maximum of the tan $\delta$ peak, where the tan $\delta$ peak is defined as: tan $\delta$=E"/E', where E" is the loss modulus, which is proportional to the loss of energy as heat in a cycle of deformation and E' is the storage or elastic modulus, which is proportional to the energy stored in a cycle of deformation [See Ferry, J. D. In Viscoelastic Properties of Polymers, 3rd ed., Wiley: New York (1980), Chapter 1, which is hereby incorporated by reference in its entirety]. The maximum value of the tan $\delta$ peak, while serving as a convenient measure of the Tg, typically exceeds the value that is obtained when the Tg is measured by methods such as DSC.

Figure 2:
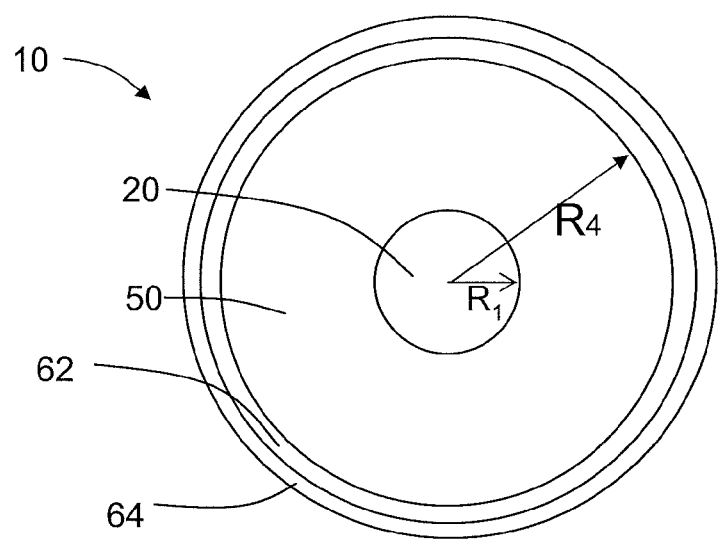
FIG. 2 is a cross-sectional view taken along the line A-A and illustrates a configuration for one example embodiment of the optical fiber of FIG. 1.

FIG. 1 is a side view of a section of the few mode optical fiber ("fiber") 10 according to the disclosure. The various example embodiments of fiber 10 are now described below with respect to cross-sectional views of the fiber and plots of the corresponding refractive index profiles. FIG. 2 is a cross-sectional view of fiber 10 taken along the line A-A in FIG. 1 and illustrates an example embodiment of fiber 10.

The optical fiber 10 comprises core 20, a cladding 50, a primary coating 62 contacting and surrounding the outer annular cladding region, and a secondary coating 64. The outer radius of the core 20 is $R_1$ and the outer radius of the cladding 50 is $R_4$. The primary coating 62 has an in situ modulus of less than 0.35 MPa, preferably less than 0.3 MPa, more preferably less than 0.25 MPa, and in preferred embodiments not more than 0.2 MPa. The primary coating 62 has an in situ glass transition temperature less than −35 C, preferably less than −40 C, more preferably less than −45 C, and in preferred embodiments not more than −50 C. A primary coating with a low in situ modulus reduces the microbending which is the coupling mechanism between the modes propagating in the fiber. The secondary coating 64 contacts and surrounds the primary coating 62. The secondary coating 64 has an in situ modulus of greater than 1200 MPa, preferably greater than 1300 MPA, more preferably greater than 1400 MPa, and in preferred embodiments greater than 1500 MPa. A secondary coating with a high in situ modulus reduces the microbending which is the coupling mechanism between the modes propagating in the fiber.

In the embodiments shown and described herein, core 20 comprises pure silica glass ($SiO_2$) or silica glass with one or more dopants that increase the index of refraction of the glass core relative to pure, undoped silica glass. Suitable dopants for increasing the index of refraction of the core include, without limitation, $GeO_2$, $Al_2O_3$, $P_2O_5$, $TiO_2$, $ZrO_2$, $Nb_2O_5$, $Ta_2O_5$, and/or combinations thereof.

The cladding 50 may comprise pure silica glass ($SiO_2$), silica glass with one or more dopants which increase the index of refraction (e.g., $GeO_2$, $Al_2O_3$, $P_2O_5$, $TiO_2$, $ZrO_2$, $Nb_2O_5$ and/or $Ta_2O_5$), such as when the cladding is "up-doped," or silica glass with a dopant which decreases the index of refraction, such as fluorine, such as when the inner cladding is "down-doped", so long as the maximum relative refractive index $[\Delta_{1MAX}]$ of the core 20 is greater than the maximum relative refractive index $[\Delta_{4MAX}]$ of the cladding 50. For example, in one embodiment, cladding 50 is pure silica glass.

Primary coating 62 preferably has an in situ glass transition temperature lower than the lowest projected use temperature of the coated optical fiber. For example, the primary coating 62 has an in situ glass transition temperature of less than −35 C, preferably less than −40 C, more preferably less than −45 C, and in preferred embodiments not more than −50 C. A low in situ glass transition temperature ensures that the in situ modulus of the primary coating will remain low even when the fiber is deployed in very cold environments. The microbending performance will therefore be stable with temperature, and this results in low mode coupling in all situations. The primary coating 62 preferably has a higher refractive index than the cladding 50 of the optical fiber 10, in order to allow it to strip errant optical signals away from the core of optical fiber. For example, an exemplary transmission optical fiber 10 may have refractive index values at a wavelength of 1550 nm for the core and cladding of 1.447 and 1.436, respectively; as such, it is desirable that the refractive index of primary coating 62 be greater than 1.44 at 1550 nm. The primary coating 62 maintains adequate adhesion to the glass fiber during thermal and hydrolytic aging, yet (if needed) is capable of being strippable therefrom for splicing purposes. The primary coating 62 typically has a thickness in the range of 20-50 μm (e.g., about 25 or 32.5 μm). The primary coating 62, if needed, can be applied to the optical fiber as a liquid and cured.

Coating 62 is a "primary" coating, which normally is applied directly to the glass fiber. Coating 62 is preferably formed from a soft crosslinked polymer material having a low in situ modulus (e.g., less than about 0.35 MPa at 25° C.) and a low in situ $T_g$ (e.g., less than about −35° C.). The in situ modulus is preferably less than about 0.3 MPa, more preferably less than 0.2 MPa and even more preferably between about 0.05 MPa and about 0.3 MPa, and most preferably between about 0.05 MPa and about 0.2 MPa. The in situ $T_g$ is preferably between about −100° C. and about −35° C., more preferably between about −100° C. and about −40° C., most preferably between about −100° C. and about −50° C.

The primary coating 62 preferably has a thickness that is less than about 40 μm, more preferably between about 20 to about 40 μm, most preferably between about 20 to about 30 μm. Primary coating 62 is typically applied to the glass fiber and subsequently cured, as will be described in more detail herein below. Various additives that enhance one or more properties of the primary coating can also be present, including antioxidants, adhesion promoters, PAG compounds, photosensitizers, carrier surfactants, tackifiers, catalysts, stabilizers, surface agents, and optical brighteners of the types described above.

A number of suitable primary coating compositions are disclosed, for example in U.S. Pat. No. 6,326,416 to Chien et al., U.S. Pat. No. 6,531,522 to Winningham et al., U.S. Pat. No. 6,539,152 to Fewkes et al., U.S. Pat. No. 6,563,996 to Winningham, U.S. Pat. No. 6,869,981 to Fewkes et al., U.S. Pat. Nos. 7,010,206 and 7,221,842 to Baker et al., and U.S. Pat. No. 7,423,105 to Winningham, each of which is incorporated herein by reference in its entirety.

Suitable primary coating compositions include, without limitation, about 25 to 75 weight percent of one or more urethane acrylate oligomers; about 25 to about 65 weight percent of one or more monofunctional ethylenically unsaturated monomers; about 0 to about 10 weight percent of one or more multifunctional ethylenically unsaturated monomers; about 1 to about 5 weight percent of one or more photoinitiators; about 0.5 to about 1.5 pph of one or more antioxidants; optionally about 0.5 to about 1.5 pph of one or more adhesion promoters; optionally about 0.1 to about 10 pph PAG compound; and about 0.01 to about 0.5 pph of one or more stabilizers.

In one embodiment, the primary coating 62 comprises 52 wt % BR 3741, (oligomer) available from Bomar Specialty Co., 41.5 wt % Photomer 4003 (monomer) available from Cognis, 5 wt % Tone M-100 (monomer) available from Dow Chemical, 1.5 wt % Irgacure 819 (photoinitiator) available from Ciba Specialty Chemical, 1 pph (3-Acryloxypropyl) trimethoxysilane (adhersion promoter) available from Gelest Incorporated, 1 pph Irganox 1035 (antioxidant) available from Ciba, and 0.03 pph Pentaerythritol tetrakis (3-mercaptoproprionate) (stability additive) available from Aldrich. This embodiment of the primary coating 62 has an in situ modulus less than 0.35 MPa and an in situ glass transition temperature less than −35° C.

Coating 64 is the outer coating, and it serves the traditional purpose of a "secondary coating". The outer coating material 64 is, for example, the polymerization product of a coating composition whose molecules become highly cross-linked when polymerized. In the embodiments described herein coating 64 has a high in situ modulus (e.g., greater than about 1200 MPa at 25° C.) and a high $T_g$ (e.g., greater than about 50° C.). The in situ secondary modulus is preferably greater than about 1300 MPa, more preferably greater than about 1400 MPa and most preferably greater than about 1500 MPa. In some preferred embodiments, the in situ secondary modulus is greater than 1600 MPa. In other preferred embodiments, the in situ secondary modulus is between about 1200 MPa and about 8000 MPa, more preferably between about 1400 MPa and about 5000 MPa, and most preferably between about 1500 MPa and about 3000 MPa. The in situ $T_g$ of the secondary coating is preferably between about 50° C. and about 120° C., more preferably between about 50° C. and about 100° C. The secondary coating 64 has a thickness that is less than about 40 μm, more preferably between about 20 to about 40 μm, most preferably between about 20 to about 30 μm.

Other suitable materials for use in outer (or secondary) coating materials, as well as considerations related to selection of these materials, are well known in the art and are described in U.S. Pat. Nos. 4,962,992 and 5,104,433 to Chapin, each of which is hereby incorporated by reference in its entirety. As an alternative to these, high modulus coatings have also been obtained using low oligomer content coating systems, as described in U.S. Pat. No. 6,775,451 to Botelho et al., and U.S. Pat. No. 6,689,463 to Chou et al., each of which is hereby incorporated by reference in its entirety. In addition, non-reactive oligomer components have been used to achieve high modulus coatings, as described in U.S. Application Publ. No. 20070100039 to Schissel et al., which is hereby incorporated by reference in its entirety. Outer coatings are typically applied to the previously coated fiber (either with or without prior curing) and subsequently cured, as will be described in more detail hereinbelow. Various additives that enhance one or more properties of the coating can also be present, including antioxidants, PAG compounds, photosensitizers, catalysts, lubricants, low molecular weight non-crosslinking resins, stabilizers, surfactants, surface agents, slip additives, waxes, micronized-polytetrafluoroethylene, etc. The secondary coating may also include an ink, as is well known in the art.

Suitable compositions for the secondary or outer coating 64 include, without limitation, about 0 to 20 weight percent of one or more urethane acrylate oligomers; about 75 to about 95 weight percent of one or more multifunctional ethylenically unsaturated monomers; about 0 to about 10 weight percent of one or more monofunctional ethylenically unsaturated monomers; about 1 to about 5 weight percent of one or more photoinitiators; about 0 to about 5 pph of one or more slip additives; and about 0.5 to about 1.5 pph of one or more antioxidants.

Suitable compositions for the outer or secondary coating 64 include, without limitation, about 10 weight percent of a polyether urethane acrylate oligomer (KWS 4131 from Bomar Specialty Co.), about 72 to about 82 weight percent ethoxylated (4) bisphenol A diacrylate monomer (Photomer 4028 from Cognis), about 5 weight percent bisphenol A diglycidyl diacrylate (Photomer 3016 from Cognis), optionally up to about 10 weight percent of a diacrylate monomer (Photomer 4002 from Cognis) or N-vinylcaprolactam, up to about 3 weight percent of a photoinitiator (Irgacure 184 from BASF, or Lucirin® TPO from BASF, or combination thereof), to which is added about 0.5 pph antioxidant (Irganox 1035 from BASF).

In at least some embodiments, the secondary coating 64 comprises 10 wt % KWS 4131 (oligomer) available from Bomar Specialty Co., 82 wt % Photomer 4028 (monomer) available from Cognis, 5 wt % Photomer 3016 (monomer) available from Cognis, 1.5 wt % Lucerin TPO (photoinitiator) available from BASF, 1.5 wt % Irgacure 184 (photoinitiator) available from Ciba Specialty Chemical (Hawthorne, N.Y.), 0.5 pph Irganox 1035 (antioxidant) available from Ciba. This embodiment of the secondary coating has an in situ modulus of about 1500 MPa and an in situ glass transition temperature (Tg) of about 55° C.

The optical fibers of the present invention can be prepared using conventional draw tower technology for the preparation of the glass fiber and coatings thereof. Briefly, the process for making a coated optical fiber in accordance with the invention involves fabricating glass fiber with its core and cladding having the desired configuration, coating the glass fiber with the primary coating composition (62), the outer coating composition (64), and then curing all coatings simultaneously. This is known as a wet-on-wet process. Optionally, each subsequently applied coating composition can be applied to the coated fiber either before or after polymerizing the underlying coatings. The polymerization of underlying coatings prior to application of the subsequently applied coatings is known as a wet-on-dry process. When using a wet-on-dry process, additional polymerization steps must be employed.

It is well known to draw glass fibers from a specially prepared, cylindrical preform which has been locally and symmetrically heated to a temperature, e.g., of about 2000° C. As the preform is heated, such as by feeding the preform into and through a furnace, a glass fiber is drawn from the molten material. The primary, intermediate, and secondary coating compositions are applied to the glass fiber after it has been drawn from the preform, preferably immediately after cooling. The coating compositions are then cured to produce the coated optical fiber. The method of curing is preferably carried out by exposing the un-cured coating composition on the glass fiber to ultraviolet light or electron beam. It is frequently advantageous to apply both the several coating compositions in sequence following the draw process. Methods of applying dual layers of coating compositions to a moving glass fiber are disclosed in U.S. Pat. No. 4,474,830 to Taylor and U.S. Pat. No. 4,851,165 to Rennell et al., each of which is hereby incorporated by reference in its entirety.

Table 1 illustrates the properties of three different primary and secondary coating combinations, Coating A, Coating B and Coating C. Coating A has a primary in-situ modulus greater than 0.35 MPa, a primary in situ Tg greater than −35 C, and a secondary in situ modulus less than 1200 MPa. Coating B has a primary in situ modulus less than about 0.2 MPa but greater than about 0.1 MPa, a primary Tg less than about −35 C but greater than about −50 C, and a secondary in situ modulus greater than about 1400 MPa. Coating C has a primary in situ modulus less than about 0.1 MPa, a primary in situ Tg less than about −50 C, and a secondary in situ modulus greater than about 1500 MPa.

TABLE 1

|  | Coating A | Coating B | Coating C |
|---|---|---|---|
| Primary in Situ Modulus, MPa | 0.4 | 0.15 | 0.085 |
| Primary in Situ Tg, C. | −32 | −45 | −55 |
| Secondary in Situ modulus, MPa | 1000 | 1500 | 1700 |

First Main Example

Exemplary Embodiments 1-9

Figure 3A:
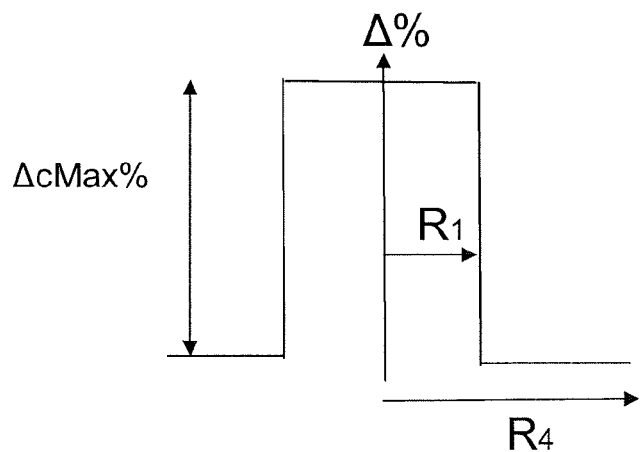
FIG. 3A is an exemplary plot of the relative refractive index profile of the one optical fiber embodiment corresponding to FIG. 2.

Table 2 illustrates the properties of one fabricated example with Coating B (EX1) and four comparative fabricated examples with Coating A (CE1 though CE4) made according to the refractive index profile shown in FIG. 3A and corresponding to the cross-section of the fiber illustrated in FIG. 2. Fiber 10 of this first example embodiment includes a step-index core 20 of radius $R_1$ and a cladding 50 surrounding the core. The cladding 50 has a (outer) radius of the $R_4$.

In this embodiment a fiber coating 60 is adjacent to and surrounds the cladding 50 and comprises at least two layers: a primary coating 62 contacting and surrounding the cladding 50 and a secondary coating 64. In the example embodiment EX1, the primary coating 62 has an in situ modulus of less than about 0.35 MPa, an in situ glass transition temperature less than about −35 C, and the secondary coating 64 surrounds the primary coating 62 and has an in situ modulus of greater than 1200 MPa. In comparative examples CEX1-CEX4, the primary coating has an in situ modulus of greater than 0.35 MPa, an in situ glass transition temperature greater than about −35 C and the secondary coating surrounding the primary coating 62 and has an in situ modulus of less than 1200 MPa.

TABLE 2

| | Example | | | | |
|---|---|---|---|---|---|
| | EX1 | CEX1 | CEX2 | CEX3 | CEX4 |
| Coating | B | A | A | A | A |
| Delta1 (%) | 0.34 | 0.34 | 0.34 | 0.34 | 0.34 |
| R1 (μm) | 8.5 | 6.2 | 7 | 8.5 | 10 |
| Alpha | 12 | 12 | 12 | 12 | 12 |
| V-Number | 4.177 | 3.047 | 3.440 | 4.177 | 4.915 |
| LP01 Attn (dB/km) | 0.196 | 0.189 | 0.193 | 0.199 | 0.203 |
| LP11 Attn (dB/km) | 0.212 | 0.214 | 0.209 | 0.216 | 0.217 |
| LP01 Aeff, 1550 nm (μm2) | 155.1 | 105.5 | 120.9 | 155.1 | 195.2 |
| LP11 Aeff, 1550 nm (μm2) | 251.1 | 264.7 | 232.6 | 251.1 | 296.2 |
| LP01 MFD, 1550 nm (μm) | 13.51 | 11.44 | 12.11 | 13.51 | 14.97 |
| LP11 MFD, 1550 nm (μm) | 12.42 | 13.28 | 12.31 | 12.42 | 13.19 |
| Theoretical LP11 Cutoff (μm) | 2.417 | 1.766 | 1.992 | 2.417 | 2.842 |
| Theoretical LP02 Cutoff (μm) | 1.522 | 1.115 | 1.257 | 1.522 | 1.788 |
| LP01 Pin Array, 1550 nm (dB) | 0.05 | 0.69 | 0.24 | 0.05 | 0.02 |
| LP11 Pin Array, 1550 nm (dB) | 27.9 | 671.2 | 219.7 | 27.9 | 5.0 |

TABLE 2-continued

| | Example | | | | |
|---|---|---|---|---|---|
| | EX1 | CEX1 | CEX2 | CEX3 | CEX4 |
| LP01 Dispersion, 1550 nm (ps/nm/km) | 22.1 | 20.58 | 21.4 | 22.1 | 22.32 |
| LP11 Dispersion, 1550 nm (ps/nm/km) | 19.14 | 7.55 | 14.18 | 19.14 | 21.02 |
| LP11-LP01 Delay, 1500 nm (ns/km) | 1.87 | 1.94 | 0.44 | 1.87 | 2.09 |
| LP11-LP01 Delay, 1550 nm (ns/km) | 1.83 | 2.34 | 0.27 | 1.83 | 2.09 |
| LP11-LP01 Delay, 1600 nm (ns/km) | 1.78 | 2.73 | 0.08 | 1.78 | 2.09 |
| MPI (dB) | −37.0 | −42.0 | −34.0 | −20.0 | −15.0 |

As shown in Table 2, the exemplary fiber EX1 made with Coating A has an MPI less than −35 dB, and a core diameter than enables a theoretical LP11 cutoff wavelength of greater than 2400 nm and an LP01 Aeff greater than 150 μm². Comparative example fiber CEX2 also has low MPI, but the small core diameter limits the theoretical LP11 cutoff wavelength to less than 1800 nm and the LP01 Aeff to less than 110 μm². Comparative example fiber CEX3 has the same core size as EX1, but the MPI value of −20 dB is unacceptable for MDM applications.

Table 3 illustrates the properties of eight modeled examples (EX2 through EX9) made according to the refractive index profile shown in FIG. 3A and corresponding to the cross-section of the fiber illustrated in FIG. 2. Fiber 10 of these example embodiments also includes a step-index core 20 of radius $R_1$ and a cladding 50 (with a radius $R_4$) surrounding the core.

In the embodiments EX2 through EX9 the fiber 10 includes a fiber coating 60 that surrounds the cladding 50 and comprises at least two layers: a primary coating 62 contacting and surrounding the cladding 50, and a secondary coating 64. In the embodiments EX2 through EX5, the primary coating 62 has an in situ modulus of less than 0.3 MPa, an in situ glass transition temperature of less than −35 C, and the secondary coating 64 surrounds the primary coating 62 and has an in situ modulus of greater than 1200 MPa. In the embodiments EX6 through EX9, the primary coating 62 has an in situ modulus of less than 0.1 MPa, an in situ glass transition temperature of less than −40 C, and the secondary coating 64 surrounds the primary coating 62 and has an in situ modulus of greater than 1400 MPa.

TABLE 3

| Example | EX2 | EX3 | EX4 | EX5 | EX6 | EX7 | EX8 | EX9 |
|---|---|---|---|---|---|---|---|---|
| Coating | B | B | B | B | C | C | C | C |
| Delta1 (%) | 0.34 | 0.34 | 0.34 | 0.34 | 0.34 | 0.34 | 0.34 | 0.34 |
| R1 (μm) | 7.2 | 7.9 | 9 | 10 | 7.9 | 9 | 10 | 10.5 |
| Alpha | 12 | 12 | 12 | 12 | 12 | 12 | 12 | 12 |
| V-Number | 3.487 | 3.826 | 4.359 | 4.843 | 3.826 | 4.359 | 4.843 | 5.086 |
| LP01 Attn (dB/km) | 0.187 | 0.186 | 0.185 | 0.184 | 0.186 | 0.185 | 0.184 | 0.184 |
| LP11 Attn (dB/km) | 0.208 | 0.205 | 0.201 | 0.198 | 0.205 | 0.201 | 0.198 | 0.196 |
| LP01 Aeff, 1550 nm (μm2) | 125.0 | 140.6 | 167.8 | 195.2 | 140.6 | 167.8 | 195.2 | 209.8 |
| LP11 Aeff, 1550 nm (μm2) | 232.0 | 238.7 | 264.3 | 296.2 | 238.7 | 264.3 | 296.2 | 314.3 |
| LP01 MFD, 1550 nm (μm) | 12.30 | 12.94 | 13.99 | 14.97 | 12.94 | 13.99 | 14.97 | 15.47 |
| LP11 MFD, 1550 nm (μm) | 12.24 | 12.25 | 12.64 | 13.19 | 12.25 | 12.64 | 13.19 | 13.51 |
| Theoretical LP11 Cutoff (μm) | 2.049 | 2.247 | 2.559 | 2.842 | 2.247 | 2.559 | 2.842 | 2.984 |

TABLE 3-continued

| Example | EX2 | EX3 | EX4 | EX5 | EX6 | EX7 | EX8 | EX9 |
|---|---|---|---|---|---|---|---|---|
| Theoretical LP02 Cutoff (μm) | 1.292 | 1.416 | 1.611 | 1.788 | 1.416 | 1.611 | 1.788 | 1.877 |
| LP01 Pin Array, 1550 nm (dB) | 0.19 | 0.09 | 0.04 | 0.02 | 0.09 | 0.04 | 0.02 | 0.01 |
| LP11 Pin Array, 1550 nm (dB) | 165.2 | 61.8 | 15.0 | 5.0 | 61.8 | 15.0 | 5.0 | 3.08 |
| LP01 Dispersion, 1550 nm (ps/nm/km) | 21.54 | 21.91 | 22.21 | 22.32 | 21.91 | 22.21 | 22.32 | 22.35 |
| LP11 Dispersion, 1550 nm (ps/nm/km) | 15.2 | 17.74 | 19.96 | 21.02 | 17.74 | 19.96 | 21.02 | 21.37 |
| LP11 − LP01 Delay, 1500 nm (ns/km) | 0.78 | 1.54 | 2.00 | 2.09 | 1.54 | 2.00 | 2.09 | 2.09 |
| LP11 − LP01 Delay, 1550 nm (ns/km) | 0.63 | 1.47 | 1.98 | 2.09 | 1.47 | 1.98 | 2.09 | 2.09 |
| LP11 − LP01 Delay, 1600 nm (ns/km) | 0.48 | 1.38 | 1.96 | 2.09 | 1.38 | 1.96 | 2.09 | 2.09 |
| MPI (dB) | −45.6 | −39.6 | −33.2 | −30.7 | −42.6 | −36.2 | −33.7 | −33.0 |

As shown in Table 3, exemplary fibers EX2 through EX9 have MPI values of less than −30 dB, a theoretical LP11 cutoff wavelengths greater than 2000 nm and LP01 Aeff greater than 110 μm². Exemplary fibers EX3 through EX9 have MPI values of less than −30 dB, a theoretical LP11 cutoff wavelengths greater than 2200 nm and LP01 Aeff greater than 140 μm². Exemplary fibers EX4, EX5 and EX7-EX9 have MPI values of less than −30 dB, a theoretical LP11 cutoff wavelengths greater than 2400 nm and LP01 Aeff greater than 150 μm².

Figure 6:
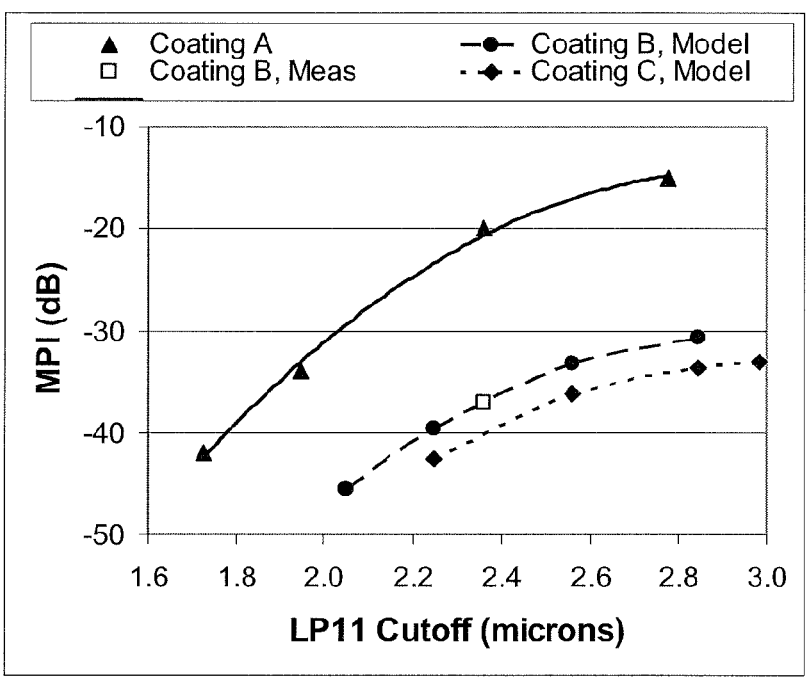
FIG. 6 is a plot of the measured and measured MPI as a function of the theoretical LP11 cutoff wavelength for three primary and secondary coating combinations.
Figure 7:
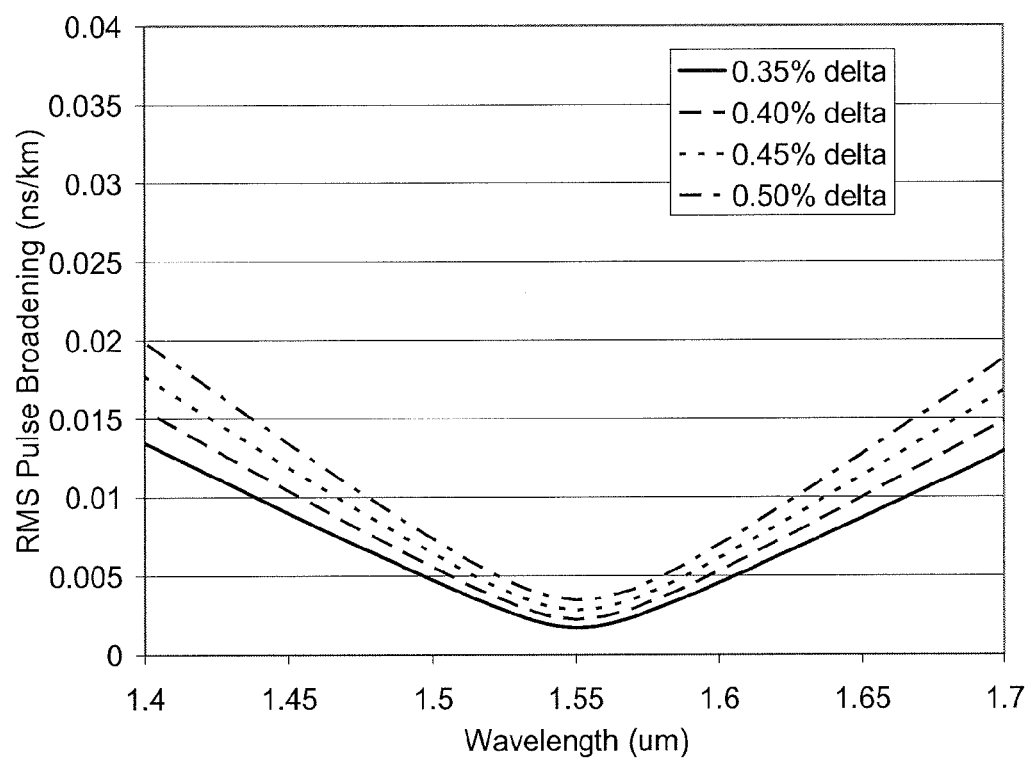
FIG. 7 is a plot of pulse broadening (ns/km) versus wavelength (µm) for different values of the maximum core relative refractive index $\Delta_{1MAX}$ (denoted "delta" in the legend) having optimum values of α.

FIG. 6 is a plot of the measured MPI as a function of the theoretical LP11 cutoff wavelength for the fiber embodiment EX1 fabricated with Coating B and four comparative fiber examples (CEX1 through CEX4) fabricated with Coating C. Also plotted are the modeled MPI of four additional exemplary embodiments (EX2 through EX5) of optical fiber 10 Coating B and four exemplary embodiments (EX6 through EX9) with Coating C. These exemplary embodiments of few moded fiber 10 have step index refractive index profiles corresponding to FIG. 3A, wherein the Ge-doped core 20 has maximum relative refractive index $\Delta_{1MAX}$ of about 0.34% (relative to cladding) and a pure silica cladding 50. These exemplary fibers relatively large core diameters (up to 24 μm (e.g., 12 μm to 20 μm), have a theoretical LP11 cable cutoff wavelength not less than 2000 nm, and an LP01 Aeff between 110 μm² and 210 μm².

Exemplary fiber embodiments EX1 through EX9 have low attenuation, MPI less than −30 dB, and theoretical LP01 cutoff wavelengths greater than about 2.0 μm. For example, some exemplary fibers 10 provide low attenuation, MPI less than −30 dB and theoretical LP11 cutoff wavelengths greater than about 2.4 μm. Other exemplary fibers 10 provide low attenuation, MPI less than −35 dB and theoretical LP11 cutoff wavelengths greater than about 2.0 μm. These advantageous properties are believed to be due to the low modulus of the primary coating 62. In contrast, comparative example fibers ether do not achieve MPI values less than −30 dB (see, for example, CEX3 and CEX4 in Table 2), or only achieve MPI values less than −30 dB when the theoretical LP11 cutoff wavelength is less than about 2.0 μm (see, for example, CEX1 and CEX2 of Table 2). A low LP11 theoretical cutoff wavelengths is undesirable because it limits core diameter, which in turn limits the LP01 effective area that can be achieved. A large core size is desirable for coupling to the optical sources in MDM systems, while a large effective area results in lower nonlinearity.

Preferably, in these (step-index) embodiments, the core 20 has a radius $R_1$ from about 4.5 μm to about 15 μm and has a maximum relative refractive index $\Delta_{1MAX}$ from about 0.2% to about 0.55% relative to the glass cladding 50. For example, $R_1$ may be between about 6 and 12 μm, or between about 7 and 11 μm. Also for example, $\Delta_{1MAX}$ may be, for example 0.45% and $R_1$ may be about 10 μm. Also, for example, $\Delta_{1MAX}$ may be, 0.35% and $R_1$ may be about 11 μm, or $\Delta_{1MAX}$ may be 0.55% and $R_1$ may be about 9 μm.

Preferably, the LP01 effective area Aeff of fiber 10 is greater than about 110 μm² and less than about 210 μm², and the glass core supports the propagation and transmission of the LP01 and LP11 modes at wavelengths greater than 1530 nm. In preferred embodiments, a theoretical cutoff wavelength of the LP02 mode is less than about 1800 nm. Preferably, the relative delay between the LP01 and LP11 modes is less than about 0.5 ns/km at a wavelength of 1550 nm. In some exemplary embodiments the relative delay of the LP11 (relative to LP01 mode) mode is less than 0.25 ns/km, and in some examples less than 0.1 ns/km. In these exemplary embodiments, the attenuation of the LP01 mode is less than 0.22 dB/km.

According to some embodiments, the MPI is less than −20 dB at a wavelength of 1550 nm; according to other embodiments, the MPI is less than −25 dB at a wavelength of 1550 nm; according to other embodiments, the MPI is less than −30 dB at a wavelength of 1550 nm; and according to other embodiments, the MPI is less than −35 dB at a wavelength of 1550 nm. In some embodiments the MPI is less than −20 dB at a wavelength of 1550 nm and a theoretical cutoff of the LP11 mode is greater than 2.4 μm. According to other embodiments, the MPI is less than −25 dB at a wavelength of 1550 nm and a theoretical cutoff of the LP11 mode is greater than 2.25 μm. According to other embodiments, the MPI is less than −30 dB at a wavelength of 1550 nm and a theoretical cutoff of the LP11 mode is greater than 2.15 μm. According to other embodiments, the MPI is less than −35 dB at a wavelength of 1550 nm and a theoretical cutoff of the LP11 mode is greater than 2.0 μm.

Second Main Example

Exemplary Embodiments 10-16

Figure 3B:
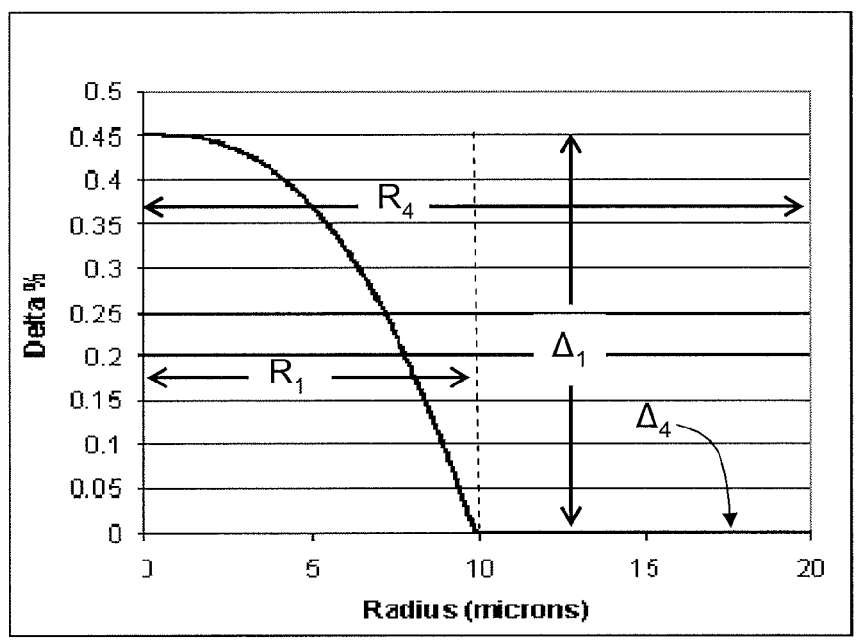
FIG. 3B is an exemplary plot of another relative refractive index profile of another optical fiber embodiment corresponding to FIG. 2.

Table 4 illustrates the properties of seven modeled examples of fiber 10 (EX10 through EX16) corresponding to the refractive index profile shown in FIG. 3B and corresponding to the cross-section of the fiber illustrated in FIG. 2. Fiber 10 of this example (embodiment EX10 through EX16) includes a graded index core 20 of radius $R_1$ and a cladding 50 surrounding the core.

In these embodiments a fiber coating 60 surrounds the cladding 50 and comprises at least two layers: a primary coating 62 contacting and surrounding the cladding 50 and a secondary coating 64. In some examples (Coating B), the primary coating 62 has an in situ modulus of less than 0.3 MPa, an in situ glass transition temperature of less than −35 C, and the secondary coating 64 surrounds the primary coating 62 and has an in situ modulus of greater than 1200 MPa. In other examples (Coating C), the primary coating 62 has an in situ modulus of less than 0.1 MPa, an in situ glass transition temperature of less than −40 C, and the secondary coating 64 surrounds the primary coating 62 and has an in situ modulus of greater than 1400 MPa.

nm. Preferably, the relative delay between the LP01 and LP11 modes is less than about 0.5 ns/km at a wavelength of 1550 nm. In some exemplary embodiments the relative delay of the LP11 (relative to LP01 mode) mode is less than 0.25 ns/km, and in some examples less than 0.1 ns/km. In these exemplary embodiments, the attenuation of the LP01 mode is less than 0.22 dB/km.

According to some embodiments, the MPI is less than −20 dB at a wavelength of 1550 nm; according to other embodiments, the MPI is less than −25 dB at a wavelength of 1550 nm; according to other embodiments, the MPI is less than −30 dB at a wavelength of 1550 nm; and according to other embodiments, the MPI is less than −35 dB at a wavelength of 1550 nm. In some embodiments the MPI is less than −20 dB at a wavelength of 1550 nm and a theoretical cutoff of the LP11 mode is greater than 2.4 µm. According to other embodiments, the MPI is less than −25 dB at a wavelength of

TABLE 4

|  | EX10 | EX11 | EX12 | EX13 | EX14 | EX15 | EX16 |
|---|---|---|---|---|---|---|---|
| Coating | C | B | C | B | B | B | C |
| Delta1 % | 0.452 | 0.389 | 0.454 | 0.446 | 0.472 | 0.547 | 0.337 |
| R1 (microns) | 10.29 | 10.86 | 9.85 | 9.77 | 9.33 | 8.66 | 11.37 |
| Alpha | 2.417 | 2.467 | 2.517 | 2.567 | 2.617 | 2.617 | 2.517 |
| V-Number | 5.75 | 5.63 | 5.52 | 5.42 | 5.33 | 5.33 | 5.49 |
| LP01 Attenuation, 1550 nm (dB/km) | 0.184 | 0.183 | 0.185 | 0.185 | 0.185 | 0.186 | 0.183 |
| LP11 Attenuation, 1550 nm (dB/km) | 0.201 | 0.198 | 0.202 | 0.202 | 0.204 | 0.209 | 0.196 |
| LP01 Aeff, 1550 nm (sq. microns) | 123.3 | 141.1 | 118.9 | 119.5 | 111.4 | 95.9 | 159.5 |
| LP11 Aeff, 1550 nm (sq. microns) | 245.1 | 280.2 | 236.1 | 237.2 | 221.0 | 190.5 | 317.3 |
| LP01 MFD, 1550 nm (microns) | 12.49 | 13.36 | 12.26 | 12.29 | 11.86 | 11.00 | 14.20 |
| LP11 MFD, 1550 nm (microns) | 12.61 | 13.49 | 12.39 | 12.42 | 12.00 | 11.14 | 14.37 |
| LP11 Cutoff (microns) | 2.629 | 2.586 | 2.548 | 2.517 | 2.485 | 2.484 | 2.532 |
| LP02 Cutoff (microns) | 1.781 | 1.750 | 1.721 | 1.698 | 1.674 | 1.673 | 1.710 |
| LP01 Pin Array, 1550 nm (dB) | 0.00 | 0.01 | 0.00 | 0.00 | 0.00 | 0.00 | 0.24 |
| LP11 Pin Array, 1550 nm (dB) | 7.11 | 22.57 | 9.38 | 11.92 | 9.18 | 2.87 | 56.57 |
| LP01 Dispersion, 1550 nm (ps/nm/km) | 21.12 | 21.24 | 21.12 | 21.14 | 21.09 | 20.96 | 21.32 |
| LP11 Dispersion, 1550 nm (ps/nm/km) | 19.46 | 19.66 | 19.10 | 18.99 | 18.64 | 18.11 | 19.77 |
| LP11 − LP01 Delay, 1500 nm (ns/km) | 0.092 | 0.089 | 0.112 | 0.120 | 0.137 | 0.154 | 0.069 |
| LP11 − LP01 Delay, 1550 nm (ns/km) | 0.0011 | 0.0013 | 0.0004 | 0.0004 | 0.0002 | 0.0060 | 0.0172 |
| LP11 − LP01 Delay, 1600 nm (ns/km) | 0.108 | 0.103 | 0.134 | 0.142 | 0.163 | 0.196 | 0.120 |
| MPI (dB) | −35.3 | −32.8 | −36.4 | −33.8 | −37.4 | −37.4 | −36.6 |

Preferably, in these embodiments, the core 20 has a radius $R_1$ from about 4.5 µm to about 15 µm and has a maximum relative refractive index $\Delta_{1MAX}$ from about 0.2% to about 0.55% relative to the glass cladding 50. For example, $R_1$ may be between about 7 and 13 µm, or between about 8 and 12 µm. Also for example, $\Delta_{1MAX}$ may be, for example 0.45% and the fiber core's outer radius $R_1$ may be about 10 µm. Also, for example, $\Delta_{1MAX}$ may be, 0.35% and $R_1$ may be about 11 µm, or $\Delta_{1MAX}$ may be 0.55% and $R_1$ may be about 9 µm. Preferably, the core 20 comprises a graded index with an alpha value greater than 2.3 and less than about 2.7 at a wavelength of 1550 nm.

Preferably, the LP01 effective area Aeff is greater than about 110 µm² and less than about 210 µm², and a theoretical cutoff wavelength of the LP02 mode is less than about 1800

1550 nm and a theoretical cutoff of the LP11 mode is greater than 2.25 µm. According to other embodiments, the MPI is less than −30 dB at a wavelength of 1550 nm and a theoretical cutoff of the LP11 mode is greater than 2.15 µm. According to other embodiments, the MPI is less than −35 dB at a wavelength of 1550 nm and a theoretical cutoff of the LP11 mode is greater than 2.0 µm.

Third Main Example

Exemplary Embodiments 17-22

Figure 4A:
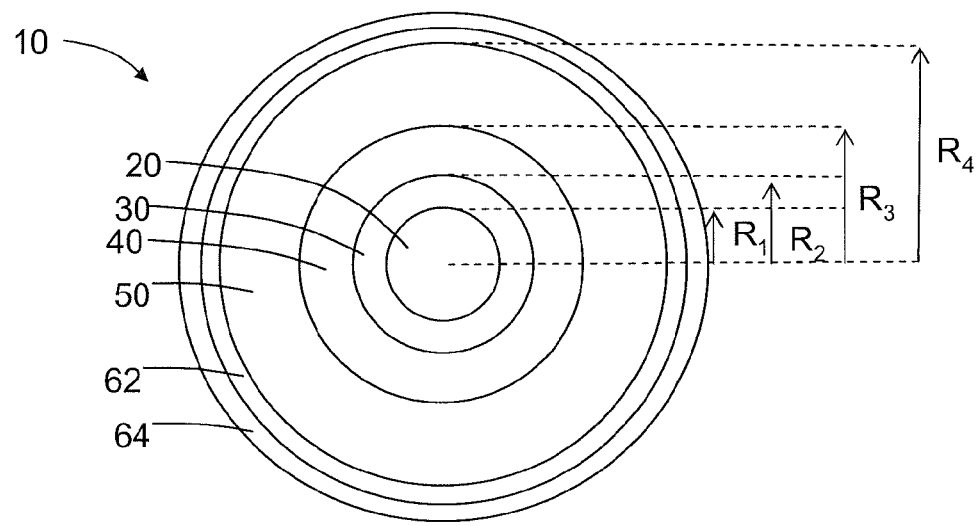
FIG. 4A cross-sectional view of the few mode fiber of FIG. 1 taken along the line A-A and illustrates a configuration for a second main example embodiment of the few mode optical fiber embodiment disclosed herein.
Figure 4B:
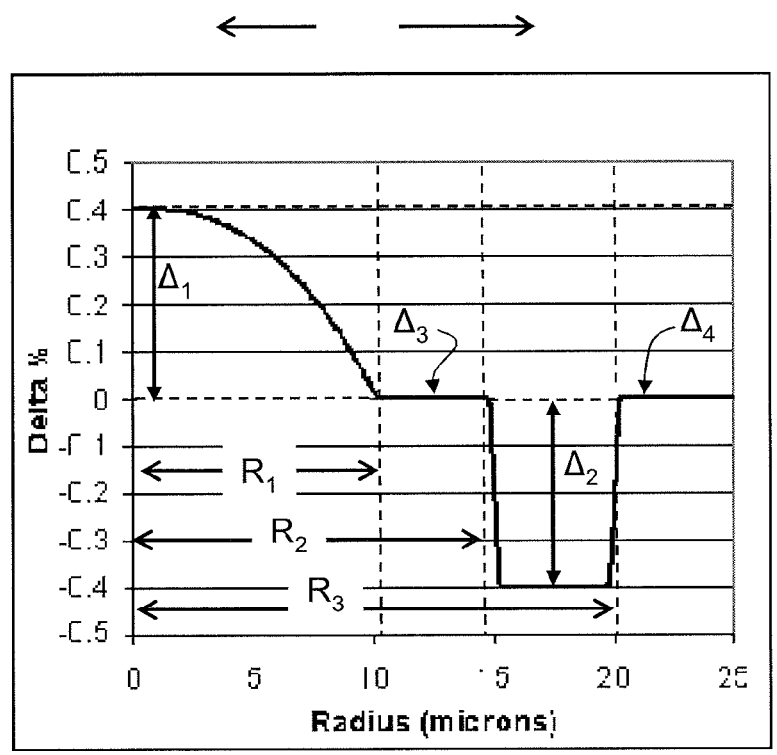
FIG. 4B is a plot of the relative refractive index profile of the few mode optical fiber of FIG. 4A.

Table 5 illustrates the properties of six modeled examples of fiber 10 (EX17 through EX22) corresponding to the refractive index profile shown in FIG. 4B and corresponding to the cross-section of the fiber illustrated in FIG. 4A. Fiber 10 of these embodiments includes a graded index core 20 of radius $R_1$ and a cladding 50 of radius $R_4$ surrounding the core. The glass cladding has a low-index (e.g., down-doped) ring 40 surrounding the core 20. In these embodiments the low index ring 40 is spaced from the core 20 by an optional region 30 (corresponding to the refractive index delta $\Delta_3$ and directly adjacent to the core 20, see FIG. 4A) The low-index ring 40 has a minimum relative refractive index $\Delta_{2MIN}<0$. The glass cladding also has an outer cladding layer surrounding the low-index ring and having a maximum relative refractive index $\Delta_{4MAX}$ such that $\Delta_{1MAX}>\Delta_{4MAX}>\Delta_{2MIN}$.

In these embodiments a fiber coating 60 surrounds the cladding 50 and comprises at least two layers: a primary coating 62 contacting and surrounding the cladding 50 and a secondary coating 64. In some examples (Coating B), the primary coating 62 has an in situ modulus of less than 0.3 MPa, an in situ glass transition temperature of less than −35 C, and the secondary coating 64 surrounds the primary coating 62 and has an in situ modulus of greater than 1200 MPa. In other examples (Coating C), the primary coating 62 has an in situ modulus of less than 0.1 MPa, an in situ glass transition temperature of less than −40 C, and the secondary coating 64 surrounds the primary coating 62 and has an in situ modulus of greater than 1400 MPa.

be between about 7 and 13 μm, or between about 8 and 12 μm. Also for example, $\Delta_{1MAX}$ may be, for example 0.45% and $R_1$ may be about 10 μm. Also, for example, $\Delta_{1MAX}$ may be, 0.35% and $R_1$ may be about 11 μm, or $\Delta_{1MAX}$ may be 0.55% and $R_1$ may be about 9 μm. Preferably, the core 20 comprises a graded index with an alpha value greater than 1.8 and less than about 2.7 at a wavelength of 1550 nm and $\Delta_{2MIN}<-0.1\%$. In some examples, the core 20 comprises a graded index with an alpha value greater than 2.3 and less than about 2.7 at a wavelength of 1550 nm and $\Delta_{2MIN}<-0.1\%$. Preferably, the spacing (thickness of region 30) between the low index ring 40 and the core 20, $R_2-R_1$, is greater than 2 mm, for example, $R_2-R_1>3$ μm, $R_2-R_1>4$ μm, or $R_2-R_1>5$ μm. Preferably, the low index ring 40 has a minimum relative refractive index delta $\Delta_{2MIN}<-0.2\%$; for example, $\Delta_{2MIN}<-0.25\%$, $\Delta_{2MIN}<-0.3\%$ or $-0.6\%<\Delta_{2MIN}<-0.2\%$.

Preferably, the LP01 effective area Aeff is greater than about 110 μm² and less than about 210 μm², and the theoretical cutoff wavelength of the LP02 mode is less than about 1800 nm. Preferably, the relative delay between the LP01 and LP11 modes is less than about 0.5 ns/km at a wavelength of 1550 nm. In some exemplary embodiments the relative delay of the LP11 (relative to LP01 mode) mode is less than 0.25 ns/km, and in some examples less than 0.1 ns/km. In these exemplary embodiments, the attenuation of the LP01 mode is less than 0.2 dB/km.

TABLE 5

|  | EX17 | EX18 | EX19 | EX20 | EX21 | EX22 |
| --- | --- | --- | --- | --- | --- | --- |
| Coating | C | B | C | B | B | C |
| Delta1 % | 0.405 | 0.364 | 0.364 | 0.395 | 0.437 | 0.4 |
| R1 (microns) | 10.13 | 10.58 | 10.58 | 9.91 | 9.70 | 10.9 |
| Alpha | 2.517 | 2.517 | 2.517 | 2.617 | 2.517 | 2 |
| Delta2 % | −0.4 | −0.4 | −0.3 | −0.4 | −0.4 | −0.4 |
| R2 (microns) | 16 | 16 | 16 | 16 | 15 | 12.5 |
| R3 (microns) | 20 | 20 | 20 | 20 | 20 | 18 |
| V-Number | 5.36 | 5.30 | 5.30 | 5.18 | 5.33 | 5.73 |
| LP01 Attenuation, 1550 nm (dB/km) | 0.184 | 0.183 | 0.183 | 0.184 | 0.185 | 0.184 |
| LP11 Attenuation, 1550 nm (dB/km) | 0.200 | 0.198 | 0.198 | 0.200 | 0.202 | 0.199 |
| LP01 Aeff, 1550 nm (sq. microns) | 129.4 | 142.5 | 142.5 | 129.2 | 119.2 | 132.4 |
| LP11 Aeff, 1550 nm (sq. microns) | 257.0 | 282.5 | 283.0 | 256.5 | 236.8 | 282.4 |
| LP01 MFD, 1550 nm (microns) | 12.79 | 13.42 | 13.42 | 12.78 | 12.28 | 13.03 |
| LP11 MFD, 1550 nm (microns) | 12.91 | 13.52 | 13.55 | 12.91 | 12.39 | 13.66 |
| LP11 Cutoff (microns) | 2.304 | 2.263 | 2.276 | 2.252 | 2.284 | 2.49 |
| LP02 Cutoff (microns) | 1.510 | 1.486 | 1.490 | 1.473 | 1.499 | 1.72 |
| LP01 Pin Array, 1550 nm (dB) | 0.00 | 0.00 | 0.00 | 0.00 | 0.00 | 0.03 |
| LP11 Pin Array, 1550 nm (dB) | 16.04 | 30.24 | 33.79 | 22.27 | 9.79 | 40.09 |
| LP01 Dispersion, 1550 nm (ps/nm/km) | 21.20 | 21.28 | 21.27 | 21.22 | 21.14 | 20.86 |
| LP11 Dispersion, 1550 nm (ps/nm/km) | 19.76 | 20.16 | 20.04 | 19.59 | 19.64 | 19.20 |
| LP11 − LP01 Delay, 1500 nm (ns/km) | 0.086 | 0.091 | 0.074 | 0.098 | 0.089 | 0.053 |
| LP11 − LP01 Delay, 1550 nm (ns/km) | 0.000 | 0.022 | 0.001 | 0.000 | 0.001 | 0.076 |
| LP11 − LP01 Delay, 1600 nm (ns/km) | 0.095 | 0.053 | 0.083 | 0.108 | 0.101 | 0.101 |
| MPI (dB) | −37.1 | −34.6 | −37.5 | −34.8 | −34.2 | −34.6 |

Preferably, in this embodiment, the core 20 has a radius $R_1$ from about 4.5 μm to about 15 μm and has a maximum relative refractive index $\Delta_{1MAX}$ from about 0.2% to about 0.55% relative to the glass cladding 50. For example, $R_1$ may According to some embodiments, the MPI is less than −20 dB at a wavelength of 1550 nm; according to other embodiments, the MPI is less than −25 dB at a wavelength of 1550 nm; according to other embodiments, the MPI is less than −30 dB at a wavelength of 1550 nm; and according to other embodiments, the MPI is less than −35 dB at a wavelength of 1550 nm. In some embodiments the MPI is less than −20 dB at a wavelength of 1550 nm and a theoretical cutoff of the LP11 mode is greater than 2.4 μm. According to other embodiments, the MPI is less than −25 dB at a wavelength of 1550 nm and a theoretical cutoff of the LP11 mode is greater than 2.25 μm. According to other embodiments, the MPI is less than −30 dB at a wavelength of 1550 nm and a theoretical cutoff of the LP11 mode is greater than 2.15 μm. According to other embodiments, the MPI is less than −35 dB at a wavelength of 1550 nm and a theoretical cutoff of the LP11 mode is greater than 2.0 μm.

MDM Optical Transmission System

The few mode optical fibers 10 according to the disclosure and examples of which are provided in Examples EX1 through EX27 have a low loss and a small differential group delay, and are suitable for use in long-haul optical transmission systems, particularly those that utilize MDM.

Figure 8:
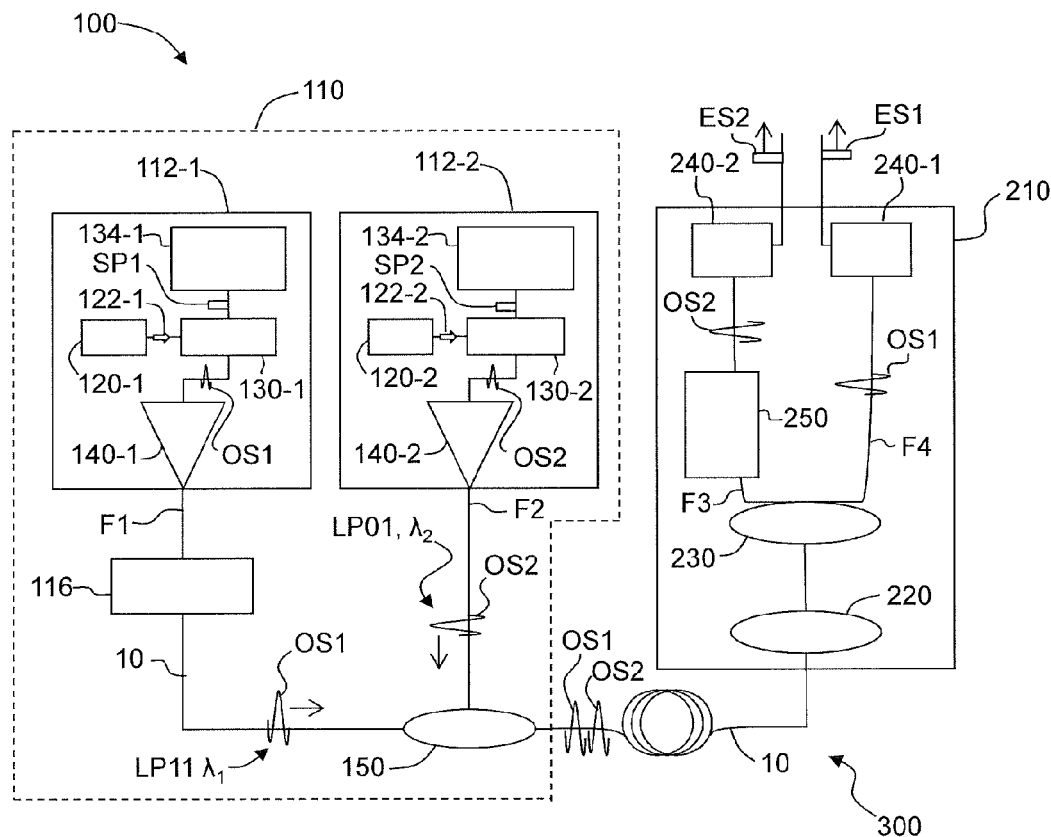
FIG. 8 is a schematic diagram of an example MDM system that uses the few mode optical fiber disclosed herein.

FIG. 8 is a schematic diagram of an example MDM optical transmission system ("MDM system") 100. MDM system 100 includes a transmitter 110 and a receiver 210 optically connected by an optical fiber link 300 that includes at least one span of fiber 10. Transmitter 110 includes two or more light sources 112 that emit light at the same or different wavelengths. Two light sources 112-1 and 112-2 are shown by way of illustration. Each light source 112 includes at least one laser 120 that emits light 122 having a wavelength between 1500 nm and 1600 nm. In an example, transmitter 110 includes at least 16 lasers transmitting at a wavelength between 1500 and 1600 nm. In another example, transmitter 110 comprises at least 32 lasers transmitting at a wavelength between 1500 and 1600 nm. In another example, transmitter 110 comprises at least 64 lasers transmitting at a wavelength between 1500 and 1600 nm.

Transmitter 110 also includes a LP01-to-LP11 mode converter 116 optically connected to light source 112-1 by a fiber section F1 (e.g., a single-mode fiber section) and that is configured to convert guided light traveling in the LP01 to travel in the LP11 mode. Generally, at least one of the light sources 112 is optically coupled to an LP01-LP11 mode converter 116, which converts at least 50% of the intensity in the LP01 mode into the LP11 mode.

Laser 120 in each light source unit 112 is optically connected to a corresponding modulator 130, which is driven by a corresponding pulse pattern generator 134 via a corresponding pulse signal SP. In an example, modulator 130 operates at a speed of 40 Gb/s or higher. In another example, modulator 130 operates at a speed of 100 Gb/s or higher.

In an example, each modulator 130 may be optically connected to a corresponding optical amplifier 140 such as an erbium-doped fiber amplifier (EDFA). Optical amplifier 140-1 is optically connected to LP01-to-LP11 mode converter 116, which in turn is optically connected to a multiplexer 150. Optical amplifier 140-2 is also optically connected to wavelength multiplexer 150.

Wavelength multiplexer 150 is optically connected to transmitter 210 via fiber 10 of optical fiber link 300. Transmitter 210 includes a wavelength demultiplexer 220 optically connected to fiber 10. Wavelength demultiplexer 220 is in turn optically connected to a splitter 230 that is connected to detectors 240-1 and 240-2 via optical fiber sections F3 and F4. A mode filter 250 is disposed in fiber section F3 to filter out either the LP01 or the LP11 mode.

In the operation of MDM system 10, each light source 120 emits light 122, which is then modulated by the corresponding modulator 130 according to the corresponding pulse signal SP from the corresponding pulse pattern generator 134. The output of modulators 130-1 and 130-2 are respective guide-wave optical signals OS1 and OS2 having respective wavelengths $\lambda_1$ and $\lambda_2$ and that propagate in the LP01 mode in respective fiber sections F1 and F2. Optical signal OS1 passes through LP01-to-LP11 mode converter 116, which is optically connected to wavelength multiplexer 150 by a section of fiber 10.

The LP11 and LP01 modes respectively associated with optical signals OS1 and OS2 are multiplexed by multiplexer 150 and then travel in fiber 10 in their respective modes. The example MDM system 10 of FIG. 5 illustrates an example where the LP01 and LP11 modes are multiplexed after mode converter 116. However, in other examples there can be an additional wavelength multiplexer that combines optical signals at different wavelengths before sending them through the LP01-LP11 mode converter.

After the optical signals OS1 and OS2 in the LP11 and LP01 modes are multiplexed by wavelength multiplexer 150, they enter into and propagate in fiber 10 of fiber link 300. In an example, the length of the span of fiber 10 in fiber link 300 is greater than 20 km, in another example, is greater than 40 km, and in another example is greater than 60 km.

Figure 9:
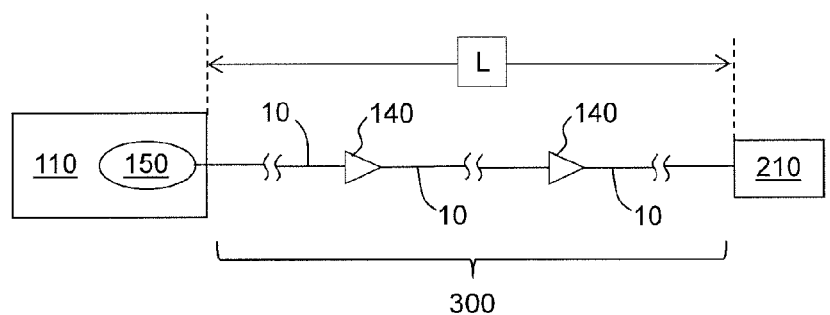
FIG. 9 is a schematic diagram of an example fiber link that optically connects the transmitter and receiver in the MDM system of FIG. 8, wherein the fiber link has multiple spans of few mode fiber connected by optical amplifiers.

FIG. 9 is a schematic diagram of an example fiber link 300 that includes multiple spans of fiber 10 that are optically coupled to each other via one or more optical amplifiers 140. Fiber link 300 has a length of L km. In an example, L is greater than 100 km, in another example, L is greater that 500 km, in another example L is greater than 1000 km and in another example, L is greater than 2000 km. In an example, there are at least two spans of fiber 10, in another example, there are at least five spans of fiber 10, in another example, there are at least ten spans of fiber and in another example, there are at least ten spans of fiber 10.

Optical signals OS1 and OS2 enter receiver 210 and are demultiplexed by wavelength demultiplexer 220. The demultiplexed signals OS1 and IS2 are then sent through splitter 230, which diverts approximately half of the signal intensity to first detector 240-1. The remaining intensity in the signal is sent through mode filter 250 in fiber section F3, and the mode filter in this example filters out the LP01 mode. In another example, mode filter 250 filters out the LP11 mode. Detectors 240-1 and 240-2 thus detect optical signals OS1 and OS2 and convert these signals into corresponding electrical signals ES1 and ES2 that can be processed downstream by processing electronics (not shown).

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An optical fiber comprising:
a core having a refractive index profile;
an annular cladding surrounding the core;
a primary coating contacting and surrounding the cladding, the primary coating having an in situ modulus of less than 0.35 MPa and an in situ glass transition temperature of less than −35° C.;
a secondary coating surrounding the primary coating, the secondary coating having an in situ modulus of greater than 1200 MPa;
wherein the refractive index profile of said core is constructed to provide a theoretical cutoff wavelength of an LP11 mode greater than about 2.0 μm and an LP01 effective area greater than 110 μm² at 1550 nm.

2. The optical fiber according to claim 1, wherein said fiber comprises a step refractive index profile, wherein said core is a glass core, and said cladding is a glass cladding;
said core comprises:
a radius $r_c$ from about 6 μm to about 15 μm;
a maximum relative refractive index $\Delta_{1MAX}$ from about 0.2% to about 0.55% relative to the glass cladding;
an LP01 effective area greater than about 110 μm² and less than about 210 μm², a theoretical cutoff wavelength of the LP02 mode is less than about 1800 nm; and
said glass cladding comprises a maximum relative refractive index $\Delta_{4MAX}$ such that $\Delta_{1MAX} > \Delta_{4MAX}$.

3. The optical fiber according to claim 2, wherein the MPI is less than −30 dB at a wavelength of 1550 nm.

4. The optical fiber according to claim 3, wherein the MPI is less than −35 dB at a wavelength of 1550 nm.

5. The optical fiber according to claim 2, wherein the differential delay between the LP01 and LP11 modes is less than about 0.5 ns/km at a wavelength of 1550 nm.

6. The optical fiber according to claim 2, wherein a theoretical cutoff of an LP11 mode is greater than 2.15 μm and the MPI is less than −30 dB at a wavelength of 1550 nm.

7. The optical fiber of claim 2, wherein said optical fiber has an LP01 attenuation of <0.22 dB/km.

8. The optical fiber of claim 2, wherein said optical fiber has an LP11 attenuation of <0.25 dB/km.

9. A mode division multiplexing (MDM) optical transmission system, comprising:
a transmitter configured to transmit first and second guided-wave optical signals respectively having a first and a second wavelength in an LP11 and an LP01 mode, respectively;
a receiver configured to receive and wavelength demultiplex the first and second optical signals; and
the few mode optical fiber of claim 2 configured to optically connect the transmitter and the receiver and support the transmission of the first and second guided-wave optical signals.

10. The optical fiber according to claim 1, wherein said fiber has graded index glass core and said cladding is a glass cladding.

11. The optical fiber according to claim 10, wherein;
said core comprises:
a radius $r_c$ from about 6 μm to about 15 μm;
a maximum relative refractive index $\Delta_{1MAX}$ from about 0.2% to about 0.55% relative to the glass cladding;
an LP01 effective area greater than about 110 μm² and less than about 210 μm², a theoretical cutoff wavelength of the LP02 mode is less than about 1800 nm; and
said glass cladding comprises a maximum relative refractive index $\Delta_{4MAX}$ such that $\Delta_{1MAX} > \Delta_{4MAX}$.

12. The optical fiber of claim 11, wherein the MPI is less than −30 dB at a wavelength of 1550 nm.

13. The optical fiber of claim 11, wherein the MPI is less than −35 dB at a wavelength of 1550 nm.

14. The optical fiber according to claim 11, wherein the differential delay between the LP01 and LP11 modes is less than about 0.5 ns/km at a wavelength of 1550 nm.

15. The optical fiber according to claim 11, wherein a theoretical cutoff of an LP11 mode is greater than 2.15 μm and the MPI is less than −30 dB at a wavelength of 1550 nm.

16. The optical fiber of claim 11, wherein said optical fiber has an LP01 attenuation of <0.22 dB/km.

17. The optical fiber of claim 11, wherein said optical fiber has an LP11 attenuation of <0.25 dB/km.

18. The optical fiber according to claim 11, wherein said fiber core has an alpha value greater than 2.3 and less than about 2.7 at a wavelength of 1550 nm.

19. A mode division multiplexing (MDM) optical transmission system, comprising:
a transmitter configured to transmit first and second guided-wave optical signals respectively having a first and a second wavelength in an LP11 and an LP01 mode, respectively;
a receiver configured to receive and wavelength demultiplex the first and second optical signals; and
the few mode optical fiber of claim 11 configured to optically connect the transmitter and the receiver and support the transmission of the first and second guided-wave optical signals.

* * * * *